United States Patent
Jeong et al.

(10) Patent No.: US 11,476,794 B2
(45) Date of Patent: Oct. 18, 2022

(54) SOLAR PACKAGE EQUIPPED WITH POWER PUMP AND MULTI-LAYER SOLAR GENERATION FACILITY USING POWER PUMP

(71) Applicants: ILJOBI, LLC, Seoul (KR); SDSYSTEM CO., LTD., Seongnam-si (KR)

(72) Inventors: Seok Young Jeong, Seoul (KR); Kwang Hwi Lee, Seoul (KR); Tae Hwa Jung, Osan-si (KR); Jinhwa Chung, Siheung-si (KR); Hyerim Gu, Bucheon-si (KR); Kyeong Hee Seo, Seoul (KR)

(73) Assignees: ILJOBI, LLC, Seoul (KR); SDSYSTEM CO., LTD., Seongnam-si (KR)

( * ) Notice: Subject to any disclaimer, the term of this patent is extended or adjusted under 35 U.S.C. 154(b) by 577 days.

(21) Appl. No.: 16/658,235

(22) Filed: Oct. 21, 2019

(65) Prior Publication Data
US 2020/0177122 A1 Jun. 4, 2020

Related U.S. Application Data

(63) Continuation of application No. PCT/KR2019/009755, filed on Aug. 6, 2019.

(30) Foreign Application Priority Data

Dec. 4, 2018 (KR) .................. 10-2018-0154304
Aug. 5, 2019 (KR) .................. 10-2019-0094844

(51) Int. Cl.
*H02S 10/10* (2014.01)
*H02J 7/00* (2006.01)
(Continued)

(52) U.S. Cl.
CPC ............ *H02S 10/10* (2014.12); *H02J 7/0018* (2013.01); *H02J 7/0047* (2013.01);
(Continued)

(58) Field of Classification Search
CPC .... H02S 10/10; H02S 20/30; H02J 7/007182; H02J 7/0018; H02J 7/0047; H02J 2300/26;
(Continued)

(56) References Cited

U.S. PATENT DOCUMENTS

2017/0257023 A1* 9/2017 Wu .................. H02J 7/342

FOREIGN PATENT DOCUMENTS

JP 2003079068 A 3/2003
KR 1020150050540 A 5/2015
(Continued)

*Primary Examiner* — Robert L Deberadinis

(57) ABSTRACT

Disclosed herein is a solar generation facility capable of using high power by configuring packages each including a power pump and a solar module in multiple stages. The solar generation facility includes a plurality of solar module packages connected in series to one another and stacked in multiple layers and at least one condenser corresponding to the solar module packages. At least one of the solar module packages has a solar module that supplies power to a load stage and a power pump that provides lifting power to the solar module. Here, the solar module outputs the power by reflecting the lifting power provided from the power pump.

20 Claims, 24 Drawing Sheets

(51) Int. Cl.
  *H02J 3/18* (2006.01)
  *H02J 7/35* (2006.01)
  *H02S 20/30* (2014.01)
  *H02J 3/38* (2006.01)

(52) U.S. Cl.
  CPC ......... *H02J 7/007182* (2020.01); *H02J 3/185* (2013.01); *H02J 3/38* (2013.01); *H02J 7/35* (2013.01); *H02J 2300/22* (2020.01); *H02J 2300/24* (2020.01); *H02J 2300/26* (2020.01); *H02S 20/30* (2014.12)

(58) Field of Classification Search
  CPC .... H02J 2300/24; H02J 2300/22; H02J 3/185; H02J 3/38; H02J 7/35; H02J 7/00; H02J 3/18
  See application file for complete search history.

(56) References Cited

FOREIGN PATENT DOCUMENTS

| | | | |
|---|---|---|---|
| KR | 20160051508 | A | 5/2016 |
| KR | 101664953 | B1 | 10/2016 |
| KR | 1020170128200 | A | 11/2017 |

\* cited by examiner p-v characteristic of solar cell examination example for number of strings (Relationship between solar cell temperature and string voltage)

SOLAR PACKAGE EQUIPPED WITH POWER PUMP AND MULTI-LAYER SOLAR GENERATION FACILITY USING POWER PUMP

CROSS-REFERENCE TO RELATED APPLICATIONS

This application is a continuation application of PCT application PCT/KR2019/009755, which was filed on Aug. 6, 2019, and which claims priority from Korean Patent Application No. 10-2018-0154304 filed with the Korean Intellectual Property Office on Dec. 4, 2018, and Korean Patent Application No. 10-2019-0094844 filed with the Korean Intellectual Property Office on Aug. 5, 2019. The disclosures of the above patent applications are incorporated herein by reference in their entirety.

TECHNICAL FIELD

The present disclosure relates to a solar power generation facility that configures a solar package by connecting power pumps or a plurality of solar packages in multiple stages.

BACKGROUND

In solar generators, current and voltage produced by solar generators depend on the differences in weather and temperature.

FIG. 1 is a diagram illustrating a curve of a change in voltage and current according to a change in solar energy. Here, P represents the peak point of the current or voltage, B represents the lowest point.

FIG. 2 is a graph illustrating a phenomenon in which the amount of voltage or current varies from point P to point B according to a time zone such as, a morning time zone, a noon time zone, an evening time zone, and, cloud, a temperature even on a clear day.

The pulse width control technology (hereinafter referred to as 'PWM') is used to enable reliable interworking between an energy storage device (hereinafter referred to as 'ESS', condenser or 'battery') and a solar cell module (hereinafter referred to as 'solar' or 'solar module') while converging a variation width of P and B.

By decreasing the effective time width of the pulse at the point P at which voltage is high and increasing the effective time width of the pulse at the point B at which voltage is low, an ESS terminal voltage may be kept constant even though the voltage from the solar module is not constant.

However, in order for the chargeable voltage to be kept stable, the voltage of the solar module needs to be at least above point A even though the ESS voltage is at the height of point B.

That is, to realize an effective power generation effect while taking into account the change in temperature and the change in the sunshine condition, the power generation voltage is always set as high as point A and the excess is controlled by PWM. In order to increase the voltage of solar modules in solar generation facility, the quantity of solar cells must be increased. Therefore, installation cost, space burden, construction complexity, and equipment cost increase with increase in the quantity of solar cells.

In short, the inter-working relationship between a solar and an ESS (battery) needs to be designed to maintain at least a chargeable natural drop voltage difference shown in FIG. 3 to enable normal charging.

When the solar voltage is not set as high as point A of FIG. 2 but set to point B of FIG. 2, a natural drop that enables charging as shown in FIG. 4 is not established at the point B or lower when solar energy becomes weak. As a result, even though the solar is generating power from solar energy, no charge current is output from the solar. In other words, the solar power becomes reactive power.

In addition, since the terminal voltage of the ESS (12V) is changed to 12V, 13.5V, 14V, 14.5V, or the like according to a charging mode, when the 12V ESS rechargeable solar is designed to be 13.5V, it may be impossible to charge even under normal solar energy, unless the ESS is fully discharged.

In general, the solar voltage is designed to be 18V considering the +10% voltage that can be charged even at the maximum ESS terminal voltage of 14.5V and +10% to ensure stability even when temperature varies. Therefore, the voltage of the solar should be designed to be 18V, which is 150% of the basic ESS voltage (12V), thus requiring 50% extra facility.

DISCLOSURE

Technical Problem

The present disclosure provides a solar power generation equipment of high voltage and high power by combining solar modules in multiple stages.

In addition, the present disclosure provides a solar power generation facility that is adapted for a power pump of the present disclosure while meeting the conventional maximum power point tracking function.

In addition, the present disclosure provides a solar power generation facility capable of using large power by configuring packages each including a power pump and a solar module in multiple stages.

Technical Solution

In order to achieve the object as described above, a solar generation facility according to an embodiment of the present disclosure includes a plurality of solar module packages connected in series to one another and stacked in multiple layers and at least one condenser corresponding to the solar module packages. At least one of the solar module packages has a solar module that supplies power to a load stage and a power pump that provides lifting power to the solar module. Here, the solar module outputs the power by reflecting the lifting power provided from the power pump.

A solar generation facility according to another embodiment of the present disclosure includes a solar module that supplies power to a load stage; a power pump that provides lifting power to the solar module; and a condenser that stores power output from the solar module. Here, a part of the power output from the solar module is input to the power pump, the power pump outputs a lifting power according to the input power, and the solar module increases the power to a comprehensive potential by reflecting the lifting power provided by the power pump and outputs the power.

A solar generation facility according to another embodiment of the present disclosure includes a plurality of strings; and a main master control unit communicatively connected to the strings to control the operation of the strings. At least one of the strings includes a solar module that supplies power to a load stage; a power pump that provides lifting power to the solar module; and a condenser that stores power output from the solar module. Here, the main master control unit monitors the power output by the strings and detects failure of the strings.

In the solar generation facility of the present disclosure, since the solar module packages in which the power pumps are combined are stacked in multiple stages and connected in series in a transformerless manner, the quantity of solar modules can be efficiently reduced, for example, an effect of reducing solar module quantity of about 30% is achieved compared to the prior art.

In addition, the solar generation facility compares the power supplied to the power pump and the power output from the power pump to control operation of the power pump at all times to maintain high efficiency and to realize maximum power point tracking at the same time.

In addition, according to the present disclosure, the solar power generation facility of high voltage and high power can be configured by simply stacking packages each in which the solar module and the power pump are integrated in series, and it is possible to cope with shadow phenomenon through independent pump operation for each package, maintain balance among solar modules, and maintain stable efficiency even under load fluctuations.

DETAILED DESCRIPTION

In this specification, singular forms may include plural forms as well unless the context clearly indicates otherwise. In this specification, terms such as "consisting of" or "comprising" should not be construed as necessarily including all of the various components or steps described in the specification, and it should be construed that some of the components or some steps may not be included or additional components or steps may be further included. In addition, terms such as "-unit", "-module", or the like refer to units that perform at least one function or operation, and the units may be implemented as hardware or software or as a combination of hardware and software.

The present disclosure provides a new technique for configuring blocks including a solar module and a power pump in multiple stages.

In addition, the present disclosure includes a multi-power interworking technology for increasing resistance to high voltage by arranging power pumps in series in multiple stages or by dividing one power pump into high voltage and low voltage to solve the above problems.

Figure 1:
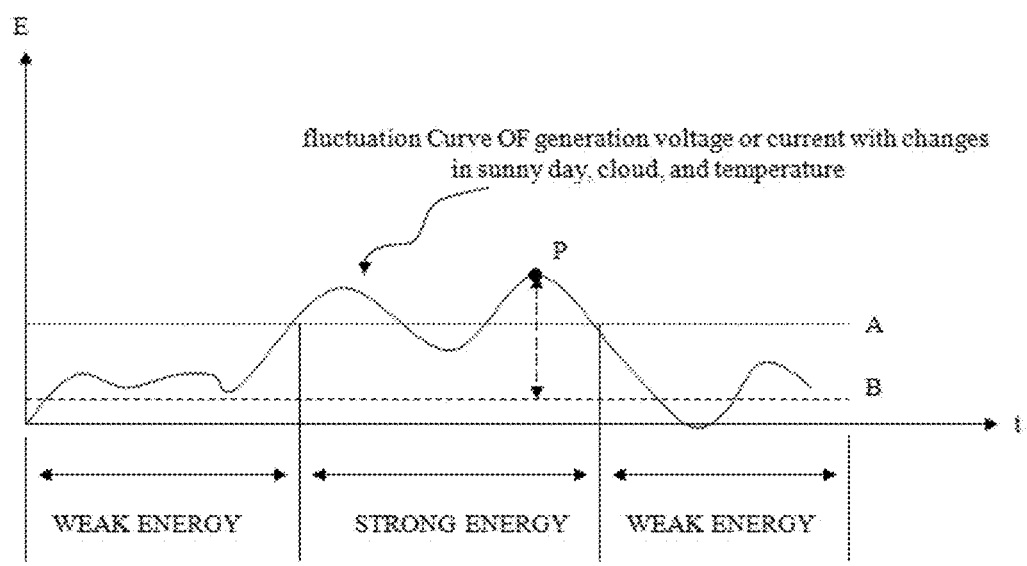
FIG. 1 is a diagram illustrating a curve of a change in voltage and current according to a change in solar energy.
Figure 2:
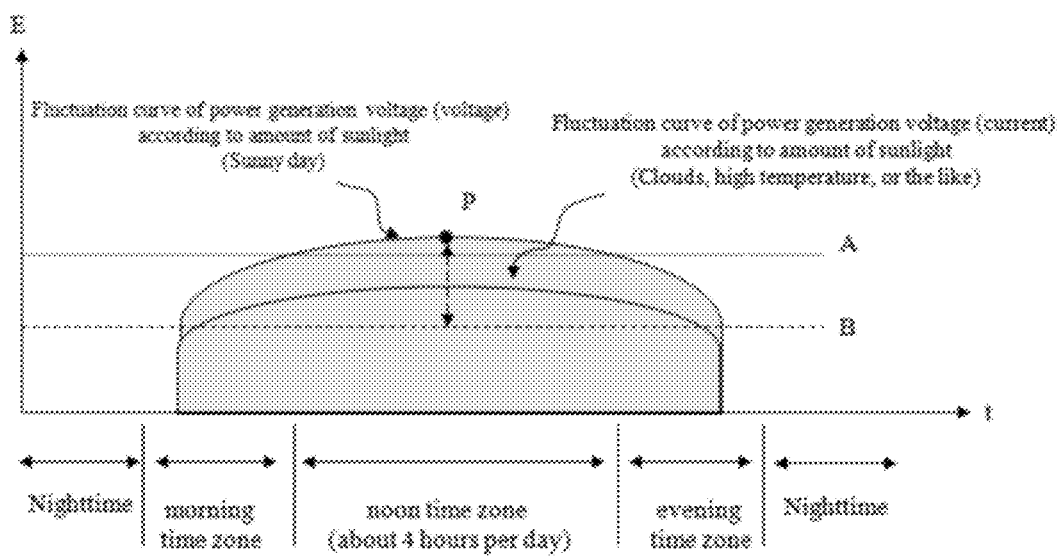
FIG. 2 is a graph illustrating a phenomenon in which the amount of voltage or current varies from point P to point B according to a time zone such as, a morning time zone, a noon time zone, an evening time zone, cloud, and a temperature even on a clear day.
Figure 3:
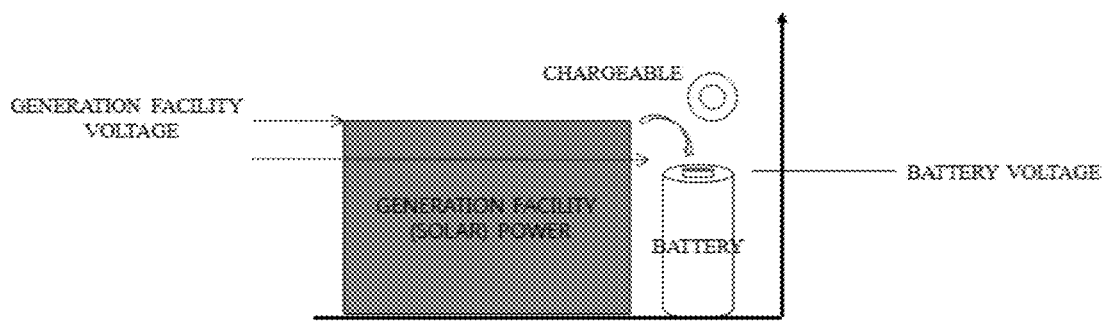
FIG. 3 is a diagram for illustrating a charging principle in which a charging path is formed in a battery under normal solar energy.
Figure 4:
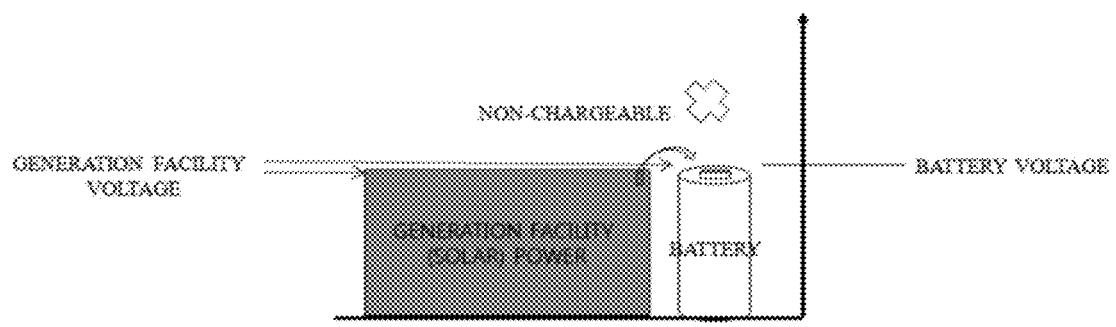
FIG. 4 is a diagram for illustrating a principle in which the charging is not possible due to a decrease in solar energy, the increase in the temperature of the solar module or the voltage of the ESS terminal.
Figure 5A:
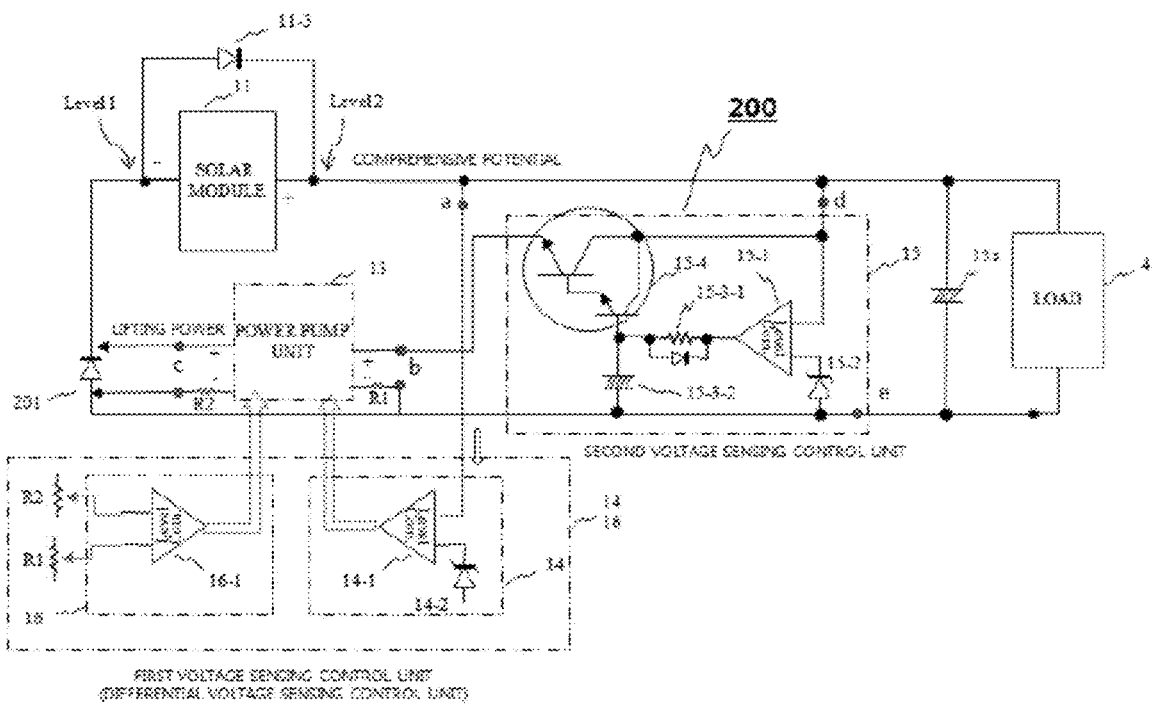
FIGS. 5A and 5B are diagrams illustrating a configuration of a power pump according to a first embodiment of the present disclosure.
Figure 5B:
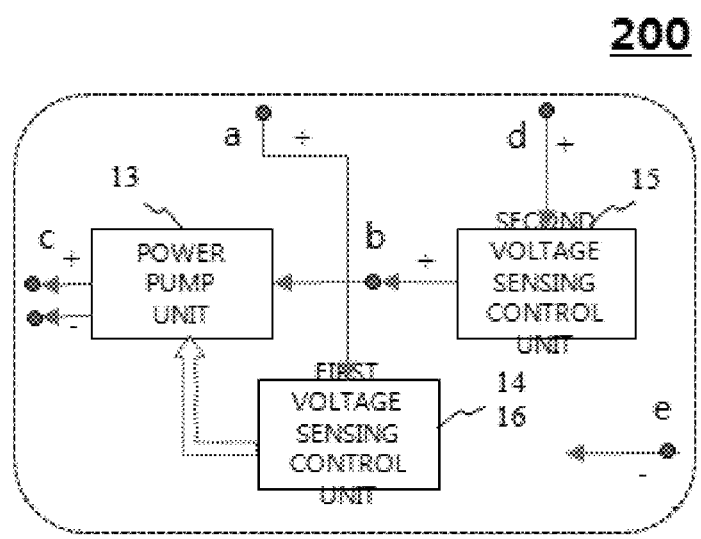

FIGS. 5A and 5B are diagrams illustrating a configuration of a power pump according to a first embodiment of the present disclosure. FIG. 5A shows an entire circuit including a first voltage sensing control unit 14 and a second voltage sensing control unit 15. FIG. 5B shows a power pump unit 13, the first voltage sensing control unit 14 and the second voltage detection control unit 15. Reference numeral 16 indicates a differential current sensing control unit which operates in conjunction with or separately from a component indicated by reference numeral 14.

A power pump 200 may receive power that is fed back from a solar module 11. In this case, the solar module 11 and the power pump 200 constitute a unit block (a package).

In the present disclosure in which the input/output terminals of the solar module 11 and the power pump 200 are connected to each other in a feedback loop, the voltage of the solar module may be shorted without reaching a constant rated voltage since a start current generated upon the start of the solar module acts as current crowding when sufficient consideration is not given to the start of the power pump 200.

According to an embodiment, the second voltage sensing control unit 15 may include a starting sequence control technology to prevent the current crowding in the initial stage of startup. The sequence control technology starts with a buffering capacitor 15a that accumulates an electromotive force generated from the solar module 11.

Figure 6:
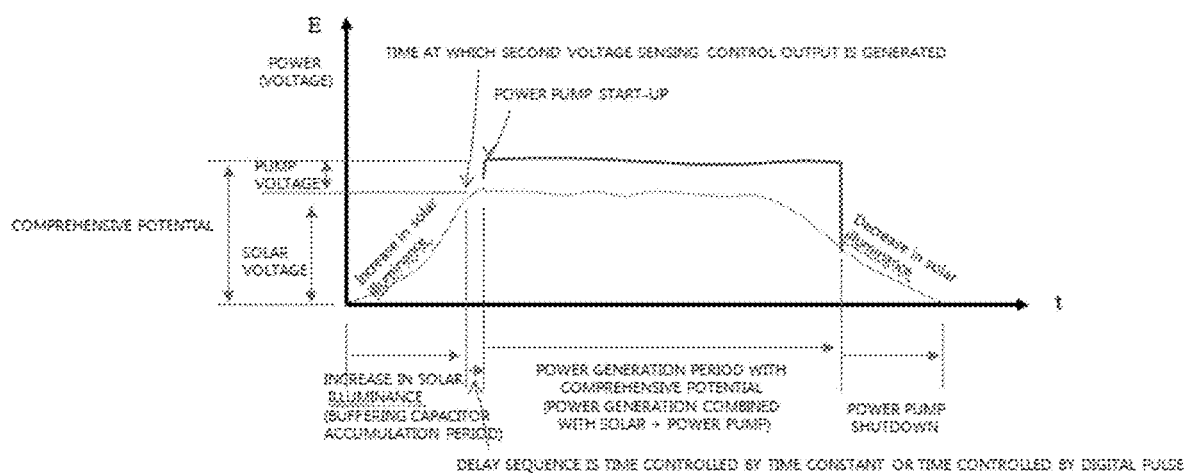
FIG. 6 is a graph showing interworking relationship with a buffering capacitor.

FIG. 6 is a graph showing an interworking relationship with the buffering capacitor 15a, and the graph shows that when power (voltage and current) is generated in the solar module 11 according to the illumination of sunlight, terminal voltage of the buffering capacitor 15a increases as a time function.

That is, when the terminal voltage of the buffering capacitor 15a reaches a predetermined level, a power supply execution unit 15-4 connected to Darlington after passing through sequence delays 15-3-1 and 15-3-2 generates an output to supply an operating power to the power pump unit 13.

When the power supply execution unit 15-4 is turned on, electric charge accumulated in the buffering capacitor 15a is supplied to the power pump unit 13 at a time. As a result, a pump voltage is generated as shown in FIG. 6 and the output of the solar module 11 is raised to the comprehensive potential. After rising to the comprehensive potential, the solar module 11 and the power pump form a normal power supply system and an output circulation system, and the buffering capacitor 15a recharges the electric charge until the comprehensive potential is reached.

The power pump and the solar module 11 are coupled to each other until the output of the second voltage sensing control unit 15 is stopped and the supply of power to the power pump unit 13 is interrupted, thereby generating power at the comprehensive potential Of course, when operation of the second voltage sensing control unit 15 is stopped, the delay sequence starts again from the beginning so that the power pump is started with the electric charge accumulated in the buffering capacitor 15a. That is, after delay is made for a predetermined time through (15-3-2) whenever restart occurs, the solar module 11 and the power pump are feedback-connected to alleviate repetitive hunting according to the startup sequence.

Figure 7A:
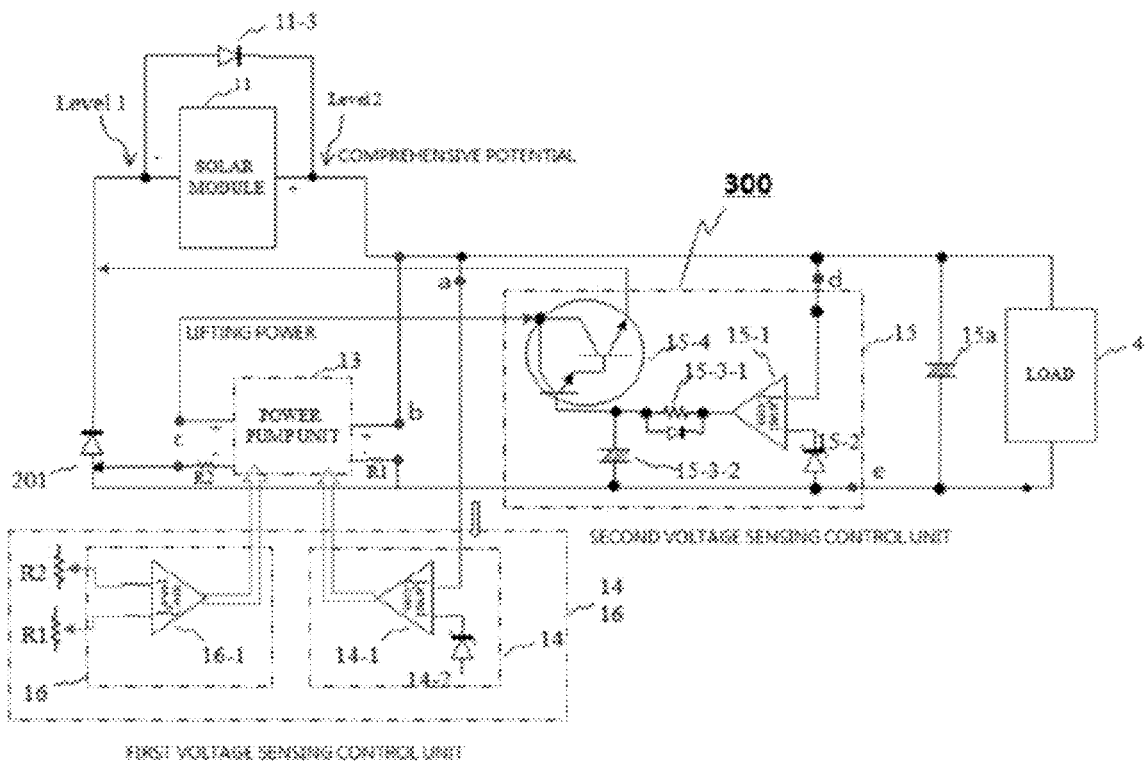
FIGS. 7A and 7B are diagrams illustrating another embodiment of FIGS. 5A and 5B according to a present disclosure.
Figure 7B:
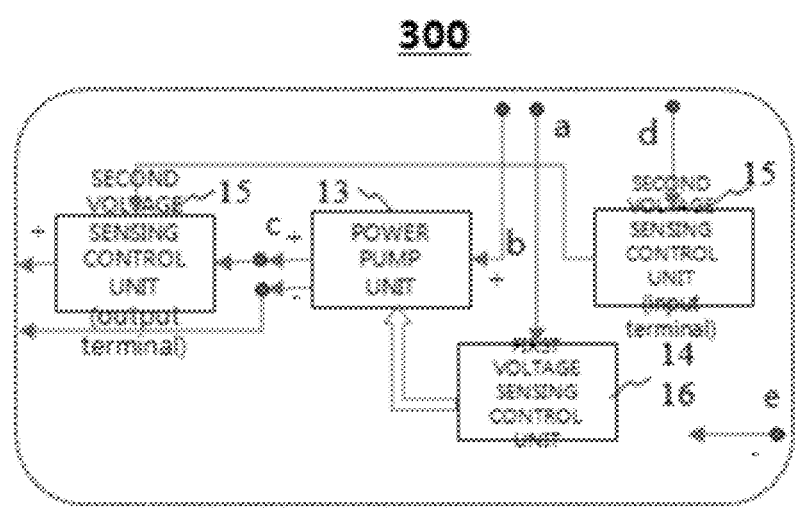

FIGS. 7A and 7B illustrate another embodiment of FIGS. 5A and 5B.

FIGS. 5A and 5B show a structure in which the second voltage sensing control unit 15 is connected to the input terminal of the power pump unit 13, while FIGS. 7A and 7B show a structure in which the second voltage sensing control unit 15 is connected to the output terminal of the power pump unit 13.

Referring to FIGS. 7A and 7B, the power pump unit 13 starts at the time when charge accumulation of the buffering capacitor 15a is completed, and then performs time-series operation through the delay sequence of the second voltage sensing control unit 15 at the time of connecting the output of the power pump to the solar module 11. As a result, the phenomenon in which both ends of the solar module 11 are short-circuited by the current crowding may be essentially blocked.

That is, FIGS. 5A and 5B in which the sequence is operated when the power pump unit 13 is started while the output of the power pump unit 13 is connected is different from FIGS. 7A and 7B in which the output of the power pump unit 13 is connected to the sequence after the power pump unit 13 is started. Although there is a difference, the delay function works in a time-series buffering role in the feedback loop with the solar module 11 to prevent the current crowding to enable starting in a stable state.

The delay sequence may be integrated into the set voltage function of the first voltage sensing control unit when the voltage is set to sufficiently accumulate voltage in the capacitor during the solar illumination rising period. That is, a time constant circuit indicated by (15-3-2) may be replaced with a soft delay function accumulated in the buffering capacitor 15a.

In addition, the delay sequence may be implemented by PWM power control, for example, PWM power control of which a duty ratio gradually increases according to a time function, in addition to the capacitor time constant. In this case, when using the PWM power control method, whether the output of the power pump is generated is detected, and restart may be performed by automatically restarting the duty ratio from the beginning when startup is not initiated or no rated voltage is generated from the solar module. It is desirable to use a soft start method that allows an on stage pulse width to gradually increase with time at startup.

In addition, it is also possible to use only auxiliary power supplied from the ESS or an external power supply during the start-up, and use a feedback-type power supply method as described later after the start-up.

That is, during start-up, a configuration may be adopted in which power is gradually increased in a change curve by a time constant of a capacitor, a start-up may be controlled by PWM power control, or power required for start-up may be temporarily supplied as a starting power from the inside or the outside.

In the present disclosure, the delay sequence softly connected upon the initial start-up corresponds to at least one of the temporary connections to the capacitor, the digital start pulse control or temporary connection to the internal and external starting power supply.

Figure 8:
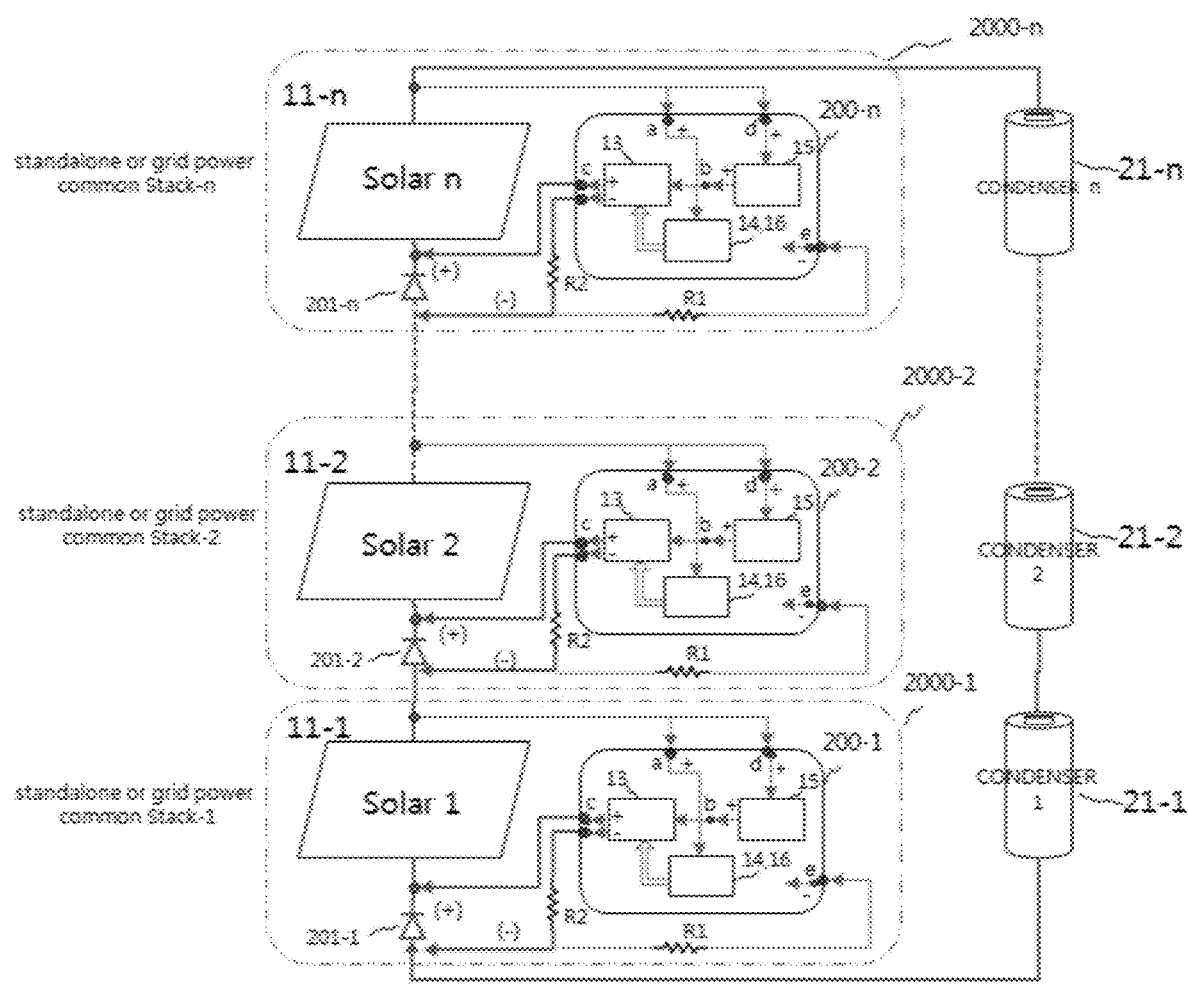
FIGS. 8 and 9 are diagrams illustrating a solar power generation facility for stacking blocks (solar packages) including a power pump and a solar module according to a first embodiment of the present disclosure in multiple stages.
Figure 9:
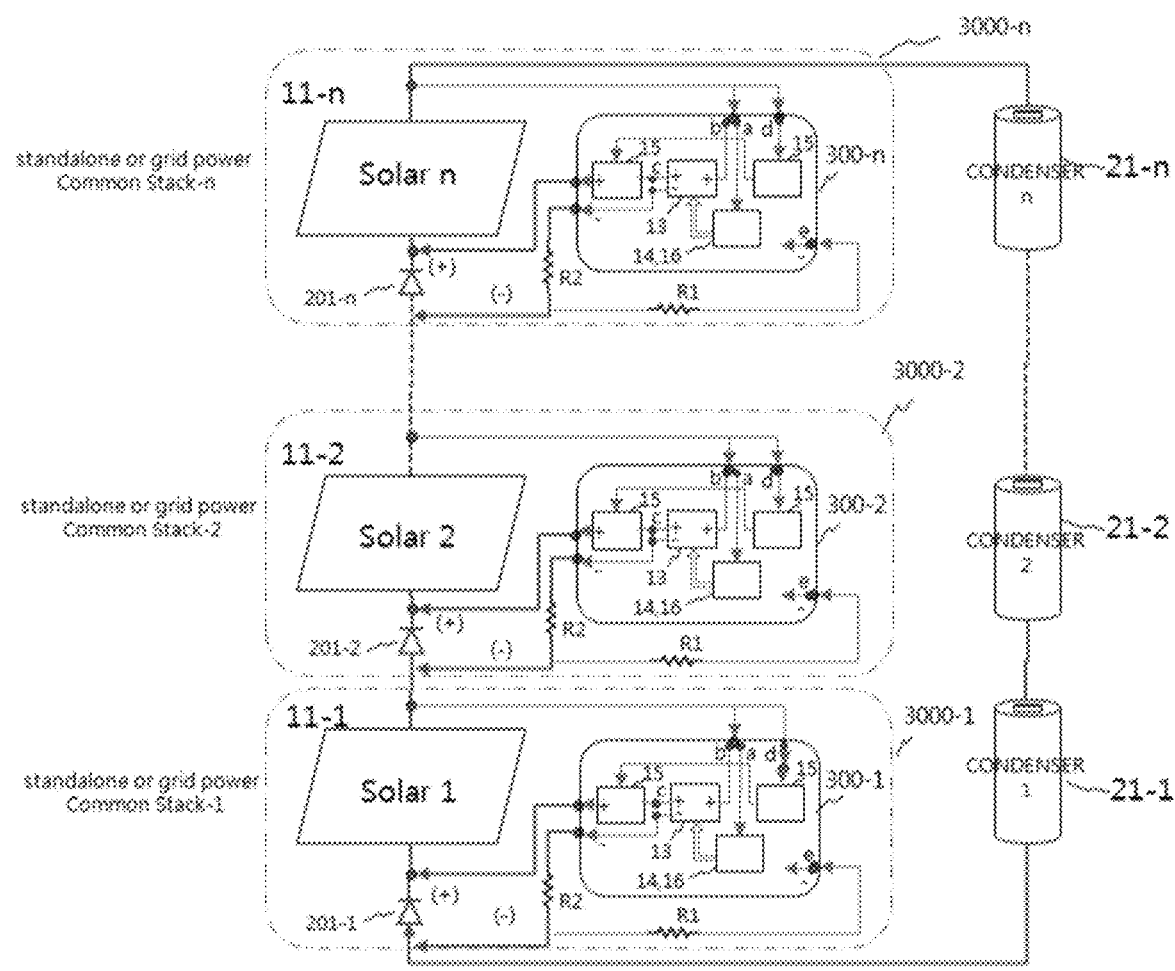

FIGS. 8 and 9 are diagrams illustrating a solar power generation facility for stacking blocks (solar packages) including a power pump and a solar module according to a first embodiment of the present disclosure in multiple stages. The solar packages are formed in a multi-stage stacked series structure to constitute a high voltage/high power generation facility.

Referring to FIGS. 8 and 9, the solar power generation facility of the present embodiment includes:

a solar module 11 configured to supply main power to a load stage;

a power pump unit 13 configured to supply a lifting power to one electrode of the solar module 11 to raise an output of the solar module 11 to a comprehensive potential;

a first voltage sensing control unit 14 configured to sense a level of the comprehensive potential; and a second voltage sensing control unit 15 configured to allow the power pump unit 13 to be driven only when a electromotive force above a voltage set in the solar module 11 is generated.

A feedback path for supplying a part of the power output from the solar module 11 to the power pump unit 13 is formed, and the first voltage sensing control unit 14 controls an operation range of the power pump unit 13, and 2, the voltage sensing control unit 15 controls the start-up of the power pump unit 13.

The power pump unit 13 and the solar module 11 are connected such that the output current of the power pump unit 13 follows the output current of the solar module 11 so as to be changed according to the intensity of sunlight.

Blocks 2000-1, 2000-2 and 2000-$n$, or 3000-1, 3000-2 and 3000-$n$) each including the power pump unit 13 and the solar module 11 may be stacked in series and in multiple stages.

In FIG. 8, the power pumps 200-1, 200-2, and 200-$n$ are respectively connected to the solar module 11-1, 11-2, 11-$n$ as an independent set.

Here, each of the power pump 200-1, 200-2, . . . , 200-$n$ may maintain a stable input voltage in a set range required by the corresponding solar module. In addition, the outputs of the power pumps 200-1, 200-2, . . . , 200-$n$ are respectively output for blocks (packages), so that load burden of each power pump 200-1, 200-2, . . . , 200-$n$ may be reduced, and further, power may be independently compensated even when shadow occur in the solar modules 11-1, 11-2, and 11-$n$.

When an input current used in the power pump is later in time than an electromotive force generated in the solar module, the voltage across the solar module may increase to a generation voltage.

On the other hand, when the power pump is electrically connected to the solar module to receive input current before the voltage across the solar module increases to the desired level, the power from the solar module is looped to a flywheel diode or bypass diode in a solar module, so that both ends of the solar module are in a short state. That is, the power pump may cause a problem of shorting both ends of the solar module, it is necessary to delay starting for a certain period to prevent the problem.

As described above, the delay sequence of FIGS. 5A to 7B is configured for this purpose, and forms a buffering capacitor that accumulates starting power in a power path supplied from the solar module, so that staring is delayed during a period for which the buffering capacitor is charged, and current is supplied to the power pump (lifter) to perform the function of a safety device.

This configuration may be implemented with functions of the sequence control units 15-3-1 and 15-3-2 that activate the path of a power supply input terminal of the power pump unit 13 or an output terminal of the power pump unit 13 after a set delay period from when the electromotive force above the set voltage from the solar module 11 is generated.

The second voltage sensing control unit 15 automatically stops the operation of the power pump unit 13 at night when no electromotive force is generated in the solar module 11, and operates the power pump unit 13 only when a predetermined electromotive force is generated in the solar module 11 during the day, thereby performing an energy saving function through day and night detection control.

In the configuration of FIG. 8, the solar module 11, the power pump unit 13, the first voltage sensing control unit 14, and the second voltage sensing control unit 15 are formed as a unit group in a package form, thereby combining the unit groups as required, for example, as required to make a high potential in series and in multiple stages. As a result, large generation power may be realized even with the same current capacity, and the power pump 200 may independently compensate the voltage of the solar module 11 in each package to match current.

In the configuration of FIG. 8, since each of the power pumps 200 receives a voltage of the solar modules 11 connected in parallel, as an input power, the power pumps 200 have the same power voltage through distribution even though a large number of solar packages are stacked.

In FIG. 8, diodes indicated by 201-1, 201-2, and 201-$n$ are members that form a current path even without a power pump. However, when the power pump is connected, a flywheel diode 13-2-3 in the power pump may replace the diode's role and a case of connecting a power pump may be omitted.

FIG. 9 is a diagram showing a multi-stage package configuration like FIG. 8 using the power pump 300 shown in FIGS. 7A and 7B, and the description duplicated with FIG. 8 will be omitted. That is, as described with reference to FIGS. 5A to 7B, the configuration of FIG. 8 in which the output terminal of the power pump 200 is connected in advance and the input terminal is started as a delay sequence is different in the structure from, but identical in the function to the configuration of FIG. 9 in which the start-up of the power pump 300 is first initiated and then the output terminal is connected as a delay sequence.

Figure 10:
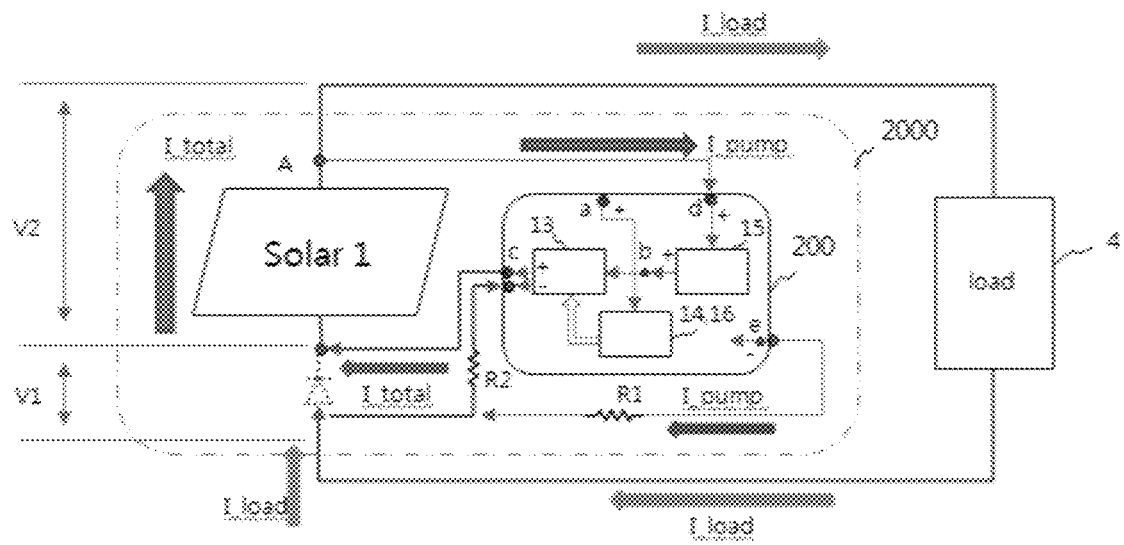
FIG. 10 is a diagram for illustrating a principle in which power supplied to a power pump is fed back from a solar module using a function relationship between current and power.

FIG. 10 is a diagram for describing a principle in which power supplied to a power pump is fed back from a solar module using a function relationship between current and power.

In FIG. 10, I_total is the total current output from the solar module Solar 1, I_load is a current output to the load terminal in I_total, and I_pump is a current supplied to the power pump 200 in I_total.

Referring to FIG. 10, when viewed from the A position having a comprehensive potential in terms of power generation, the generation power that the solar module is responsible for is 'PO1=V2*I_total', and the generation power that the power pump 200 is responsible for is 'PO2=V1*I_total'.

When viewed from the position A in terms of power consumption, the power consumption supplied to the load 4 is 'PL1=(V1+V2)*I_load' and the power consumption supplied to the power pump 200 for the operation of the power pump 200 is 'PL2=(V1+V2)*I_pump'. Here, PO1 and PO2 are connected in series to act as an increase in power generation, and PL1 and PL2 are connected in parallel to act as distributed power consumption.

That is, a part of the power generated through the solar module (Solar 1) is used as the operating power of the power pump 200, but the overall output according to the use of the power pump 200 is the power generation of the entire series structure '(V1+V2)* I_total', that is, a loop in which power is recovered is formed. This circulating loop is possible because continuous inflow of solar energy from the solar module solar 1 (when the sunlight is not introduced, the second voltage sensing control unit 15 automatically blocks the loop operation).

Hereinafter, the operation will be described in detail through specific numerical values.

For example, it is assumed that the solar module is at 24V, the power pump output terminal is at 3V, the load terminal is at 27V, the current (I_total) generated by the solar module is 10 A, and the efficiency of the power pump 200 is 100% (actually 85% to 98%, but is assumed as 100% for convenience of description).

First, the power at the output terminal of the power pump is 'PL2=3V *10A=30W'.

Next, the power of A having the comprehensive potential is 'PO1=(3V+24V)*10 A=270 W'. Here, the power supplied to the load stage is '(PO1-PL2)=(270 W-30 W)=240 W', and as a result, it can be seen that the load current (I_load) is 'I_load=240 W/27V=8.89 A'.

In addition, it can be seen that the current supplied to the power pump 200 is 'I_pump=30 W/27V=1.11 A'.

Here, since I_total current 10 A is the sum of I_load 8.89 A and I_pump 1.11 A, Kirchhoff s Current Law's current law, that is, the natural law in which the sum of the current flowing to the closed circuit and the current flowing therefrom is equal to each other is satisfied.

In summary, among the power 270 W (27V, 10 A) obtained at the comprehensive potential, 30 W (27V 1.11 A) is used for the operation of the power pump 200 and the remaining 240 W (27V, 8.89 A) is supplied to the load stage 4 as an effective output. I_pump (1.11 A) does not disappear through consumption, and is re-input to a negative electrode to form a feedback path circulated back to I_pump, and I_load forms a relationship of acting as energy for the load stage 4 while passing through the load stage 4. Considering the efficiency of 85% to 98%, the actual power dissipation among the power of 30 W is about 2% to 15%, that is, about 0.6 W to 4.5 W.

According to one embodiment, the first voltage sensing control unit 14 may control the operation of the power pump 200 so as to maintain the voltage corresponding to the 30 W, the second voltage sensing control unit 15 may control a path for power supply of the I_pump.

It is noted that, since the current crowding may occur between the input terminal and the output terminal at the initial stage of the start-up of the power pump 200, the buffering capacitor 15a and the delay sequence circuits 15-3-1 and 15-3-2 which prevent the current crowding may be included in the voltage sensing control unit 15.

On the other hand, the output terminal of the power pump 200 continuously fluctuates according to the voltage required by a load, the intensity of sunlight, the temperature coefficient that varies in the solar, and I_pump is continuously changed according to the fluctuation.

According to one embodiment, the first voltage sensing control unit 14 may include a differential current sensing control unit 16 that compares the power output from the power pump unit 13 and the power supplied to the power pump unit 13 to perform control to supply a lifting power at the optimum efficiency.

The differential current sensing control unit 16 may perform power comparison by using a first current sensor R1 connected to an input terminal power supply path of the power pump unit 13 and a second current sensor R2 connected to an output terminal of the power pump unit 13.

In particular, the first current sensor and the second current sensor of the present disclosure may be replaced with a first hall sensor and a second hall sensor, which are not shown. In this case, the hall sensors may interwork with the control unit in a state of being insulated regardless of a high voltage, a positive (+) or negative (−) polarity.

In addition, when the first hall sensor at detects current in the forward direction and the second hall sensor that detects current in the reverse direction are configured to cancel the current, the maximum current may be tracked through static circuit detection without the use of a computing device, such as a microprocessor by using a neutral point, which is a difference between the first current and the second current.

Figure 11:
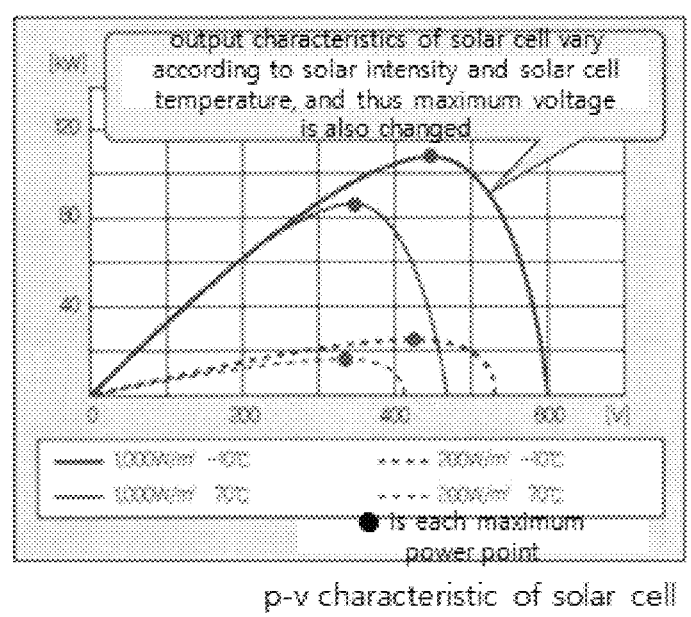
FIGS. 11 and 12 are diagrams showing graphs showing characteristics of a solar module related to the operation of FIG. 10.
Figure 12:
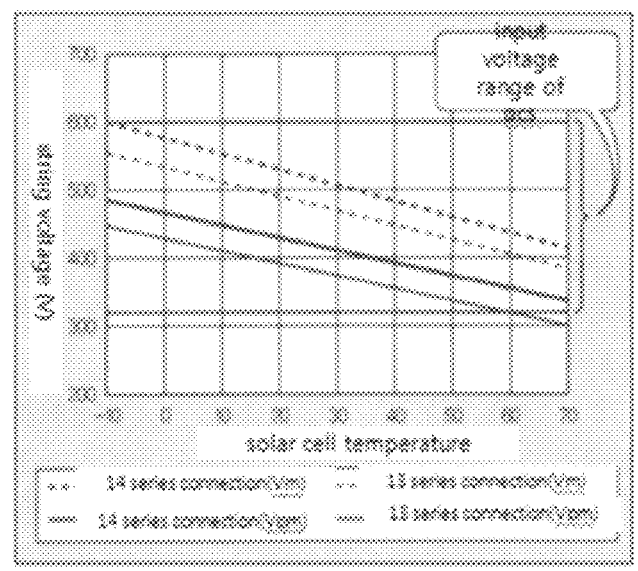

FIGS. 11 and 12 are diagrams showing graphs showing characteristics of a solar module related to the operation of FIG. 10. Specifically, FIG. 11 is a graph showing a characteristic in which the maximum power point fluctuates according to the intensity of sunlight, and FIG. 12 is a graph of a characteristic in which voltage fluctuates according to a temperature of the solar module.

The voltage and current of the solar module fluctuate according to the intensity and temperature of the sunlight. Here, the temperature coefficient may be measured by a sensor such as a thermistor, but the maximum power point that varies according to the intensity of sunlight has not been able to be detected by the sensor until now, so the state of the solar module had to be examined.

For example, the conventional maximum power point tracking technique has obtained the maximum power point by sensing the power supplied to the load stage while slightly changing a voltage level of the load stage connected to the solar module using the PWM technology. In this case, when the power is lowered by changing the load voltage higher, the power is tracked while changing the load voltage lower in the opposite direction, that is, the maximum power point is tracked through swing (whether the maximum power point is correct may be determined through swing). Since the swing of the load voltage is a principle in which the maximum power point is determined by shifting the load voltage without any reference because there is no reference (reference point) of the solar module itself, the maximum power point is capable of being tracked, but the power loss when shifting in the opposite direction may cause power loss during the swing process, resulting in inefficiency.

Figure 13:
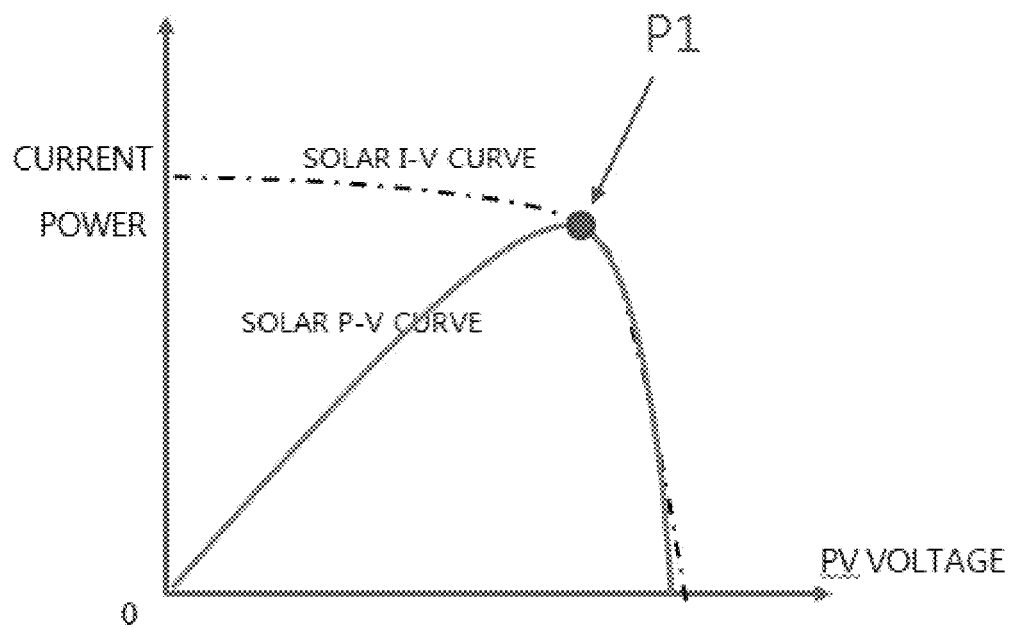
FIG. 13 is a graph showing a relationship between voltage and current of a solar module.

FIG. 13 is a graph showing a relationship between voltage and current of a solar module. Here, the dotted line graph is a solar I-V curve representing the voltage-current relationship of the solar module, and the solid line graph is a solar P-V curve representing the voltage-power relationship of the solar module, and the overlapping of the two graphs represents the correlation relationship of voltage-current-power.

Figure 14:
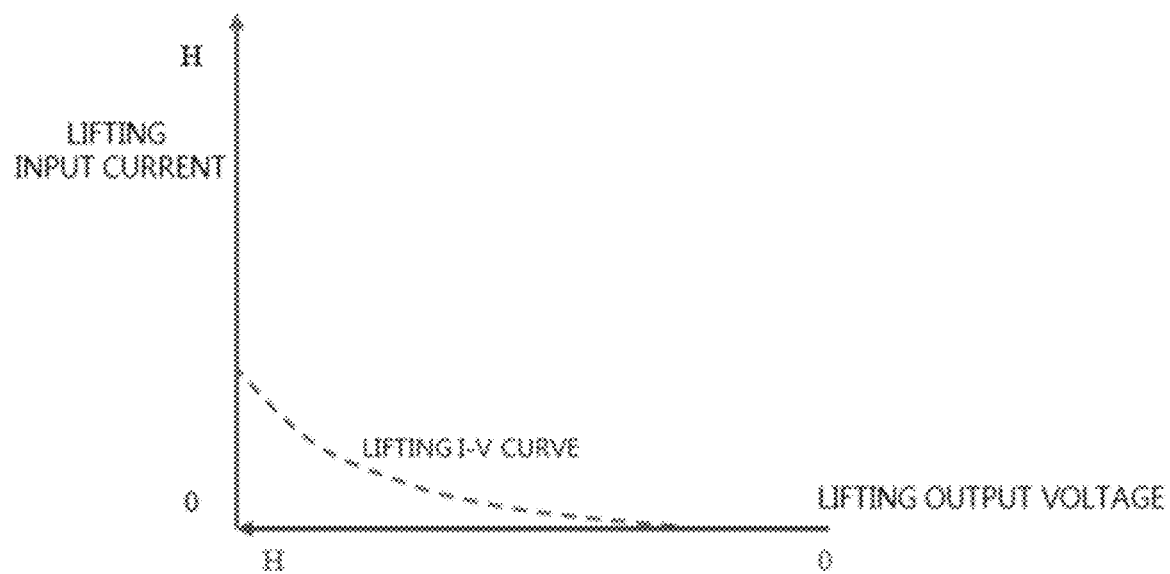
FIG. 14 is a diagram showing a lifting I-V curve graph showing a relationship between a lifting output voltage that is the output of a power pump and a lifting input current

FIG. 14 is a diagram showing a lifting I-V curve graph showing a relationship between a lifting output voltage that is the output of a power pump and a lifting input current As shown in FIG. 14, as a lifting output voltage increases, the power dissipation consumed by the power pump increases, that is, the operation current for lifting increases, which represents the opposite characteristics to the Solar I-V curve.

In this way, when an intersection point is found by overlapping the functions having mutually opposite characteristics, a detection result of the static maximum current point may be obtained unlike the conventional maximum power point tracking. In particular, using this technique, it is possible to obtain a static stable result without performing the artificial swing.

Figure 15:
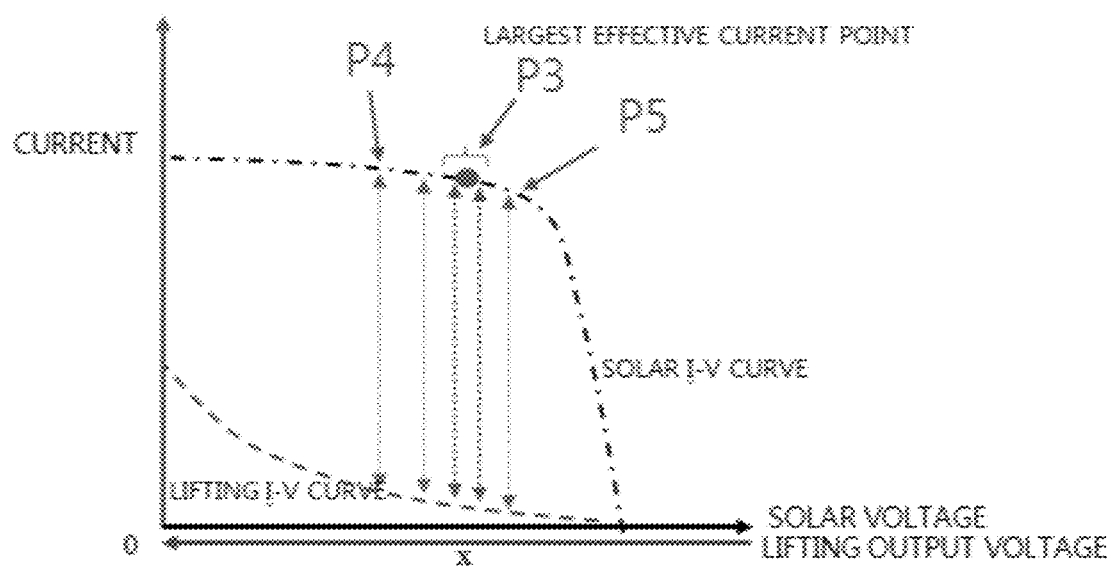
FIG. 15 is a diagram showing a graph overlapping a solar I-V curve and a lifting I-V curve.

FIG. 15 is a diagram showing a graph overlapping a solar I-V curve and a lifting I-V curve.

As shown in FIG. 15, even without using a special calculation equation, it can be seen that the solar current deducting the lifting current has a maximum difference at point P3 rather than point p4 or point P5.

In addition, the maximum power point may be obtained by multiplying a current difference value at point P3 by the voltage at position A in FIG. 10, and as a result, the maximum power generation point may be tracked based on the solar module in the comprehensive potential state. Unlike the conventional maximum power point tracking in which the maximum power point is dynamically obtained by adjusting the voltage of the load stage, the present disclosure has characteristics in that the maximum power point is obtained using the measured value by a static comparison method for comparing the solar module and the power pump.

The present disclosure has a special effect by acquiring a functional relationship between the power consumption at the time of supplying power to the power pump and start-up power (i.e., pump power) obtained by the output power from the power pump as a static opposite relationship.

The overall interworking relationship of the power pump will be described below.

Referring back to FIG. 10, when only the voltage at the position A is sensed in FIG. 10 to control the first voltage sensing control unit 13 to increase the output at the position A, unnecessary over pumping (referring to excessive output voltage of the power pump) may occur even though the potential at the position A is the same. This is a characteristic of the solar I-V curve presenting that the current does not actually increase beyond the current determined by sunlight even when the solar module itself is short-circuited.

That is, even when excessive pumping occurs, an overload phenomenon (voltage compression unbalance) in which the comprehensive potential of A does not become higher but V2 decreases as V1 increases occurs between both ends of the solar module in FIG. 10. However, it can be understood that the overload causes a decrease in the power 'V2*I_total', of which the solar module is charge, within the same range of output current rather than an increase in output current.

In the excessive pumping state of the power pump 200, the input power supplied to the power pump 200 also increases. This is because 'V1*I_total' decreases instead of the decrease in 'V2*I_total' so that the comprehensive potential remains the same. However, since the increased excessive pumping does not affect the change of the comprehensive potential at the position A and the comprehensive power that is 'comprehensive potential * I_total' as described above, the same effect as that of the maximum power point tracking is obtained when control is performed such that the input power of the power pump does not excessively increases compared to the comprehensive power by obtaining a difference between the comprehensive power and the input power of the power pump, by using the above-described characteristics inversely.

In other words, the maximum comprehensive power efficiency obtained through the operation of the power pump 200 becomes the maximum power point obtained from the solar module, which represents that the input power supplied to the power pump 200 and a pumping output which is output from the power pump 200 operates at the highest efficiency, so that the conventional maximum power point tracking is possible without the swing through a static detection obtained by the principle shown in the graph of FIG. 15.

That is, since the power pump input current I_pump of the present disclosure operates as a reference, the conventional swing may be eliminated. As described above, the present disclosure encompasses the concept achieved through a simple hardware offset configuration.

Figure 16:
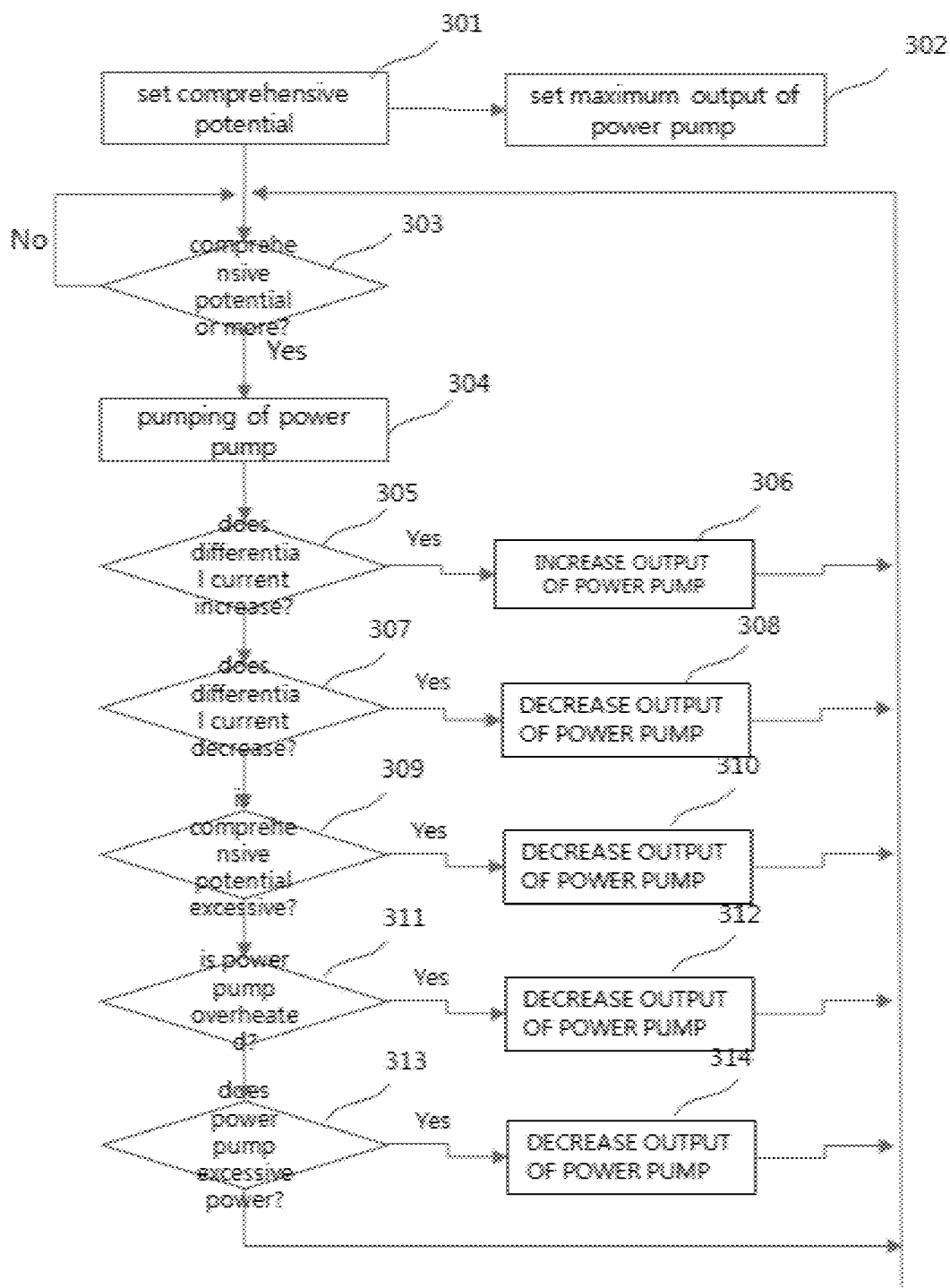
FIG. 16 is a flowchart of a control process for operating a power pump in each package at an optimum efficiency.

FIG. 16 is a flowchart of a control process for operating a power pump in each package at an optimum efficiency.

Referring to FIG. 16, the power pump first sets a comprehensive potential reference, and the comprehensive potential reference is a parameter for determining in which range the power pump operates based on a specific solar module rated voltage (301, 302). The comprehensive potential reference may be set manually or automatically by an administrator.

For example, a composite potential may be necessarily up to 32V, but when the solar module is at 24V, 8V is the maximum output voltage of the power pump. Here, the current of the power pump follows the solar module and be supplied in series so that the current of the power pump must be equal to or larger than a current capacity of the solar module. In addition, adjusting an output terminal voltage of the power pump by determining whether it is lack in voltage may be automatically performed through the first voltage sensing control unit according to a load requirement.

Subsequently, the second voltage sensing control unit determines whether a voltage output from the solar module has reached an appropriate range and controls the power supply of the power pump (303 and 304). This configuration does not operate at night and operates only during the day and includes waiting until the buffering capacitor 15a accumulates electric charge to a constant potential and the amount of charge from the sunrise at the beginning of the day and supplying input power to the power pump or initiating interworking with the output terminal of the power pump.

After initiating inter-working with the output terminal of the power pump, the power pump needs to output only the lacking 8V. Since the solar module becomes lower than 24V when the output voltage of the solar module becomes higher, the second voltage sensing control unit preferably control the solar module to be maintained within a certain range. In this case, it is preferable to additionally adopt a configuration that compensates for a change in the solar module voltage according to the temperature, that is, the voltage temperature coefficient to correct a reference value.

Next, the power pump initiates startup and perform control to increase a pumping output while the differential current sensing controller 16 of the first voltage sensing control unit 14 determines whether a differential current increases (305, 306). Here, the differential current refers to a difference between the current supplied to an input terminal of the power pump and current obtained at a comprehensive potential output terminal which is position A of FIG. 10. In general, since the comprehensive power is larger than the pumping power, a large differential current means an increase in generation power.

Subsequently, the power pump maintains the power pump output in that there is no change in the differential current, or performs tracking to reduce the pumping at the time when the differential current decreases (307, 308). That is, since excessive pumping occurs, the power consumed by the power pump is increased rather than increase in the comprehensive potential due to the output of the power pump, which in turn causes decrease in the differential current, at this time, the differential current sensing control unit of the first voltage sensing control unit controls the output of the power pump such that the power pump maintains or decreases an output.

In this case, since the differential current is directly obtained by the difference between the detection amounts of the two current sensors, it can be seen that it is not necessary to obtain the differential current through the swing. In addition, when the differential current is not necessarily the maximum value but is set in advance to be positioned at a neutral point at which the two sensors are opposite to each other, the static detection action allows the power pump's output potential to be regularly controlled at an optimized ratio of supply to output.

When the comprehensive potential excessively increases according to the operation of the power pump, the output potential of the power pump is lowered (309 and 310). In this case, the first voltage sensing control unit 14 controls the power pump by sensing the comprehensive potential. This is caused by the influence of an open voltage (Voc) of a solar when a maximum output of the power pump is set too high or the load stage is open.

When the power pump is excessively overheated, the power pump output may be reduced to protect internal circuits of the power pump (311 and 312). This is a phenomenon that occurs when an output line of the power pump is shorted or when the power pump capacity is designed to be less than a current capacity of the solar module. The overheating may be determined by a temperature sensor mounted on a heat sink or through a sensing function of a current limiting circuit.

When the power pump generates excessive power, the output of the power pump itself may be lowered even though the comprehensive potential does not increase (313, 314). When the load stage is heavy, voltage across both sides of the solar module is compressed rather than the comprehensive potential rises, thereby preventing overload from being caused in the solar module. This operation may be made by setting maximum power of the power pump (302). Alternatively, this phenomenon may occur when the solar module does not operate a power generation function in many cells due to strong shading even under a normal load stage.

Although the swing is substantially unnecessary in the principle of the present disclosure, the present disclosure may include an additional configuration that determines whether a current state is an optimal power pumping state through the periodic fine swing during the pumping 304 of the power pump. For example, the power generation facility of the present disclosure may apply an unbalanced shock signal for determining whether a state is stable using a trigger pulse every 5 seconds to 10 seconds.

Figure 17:
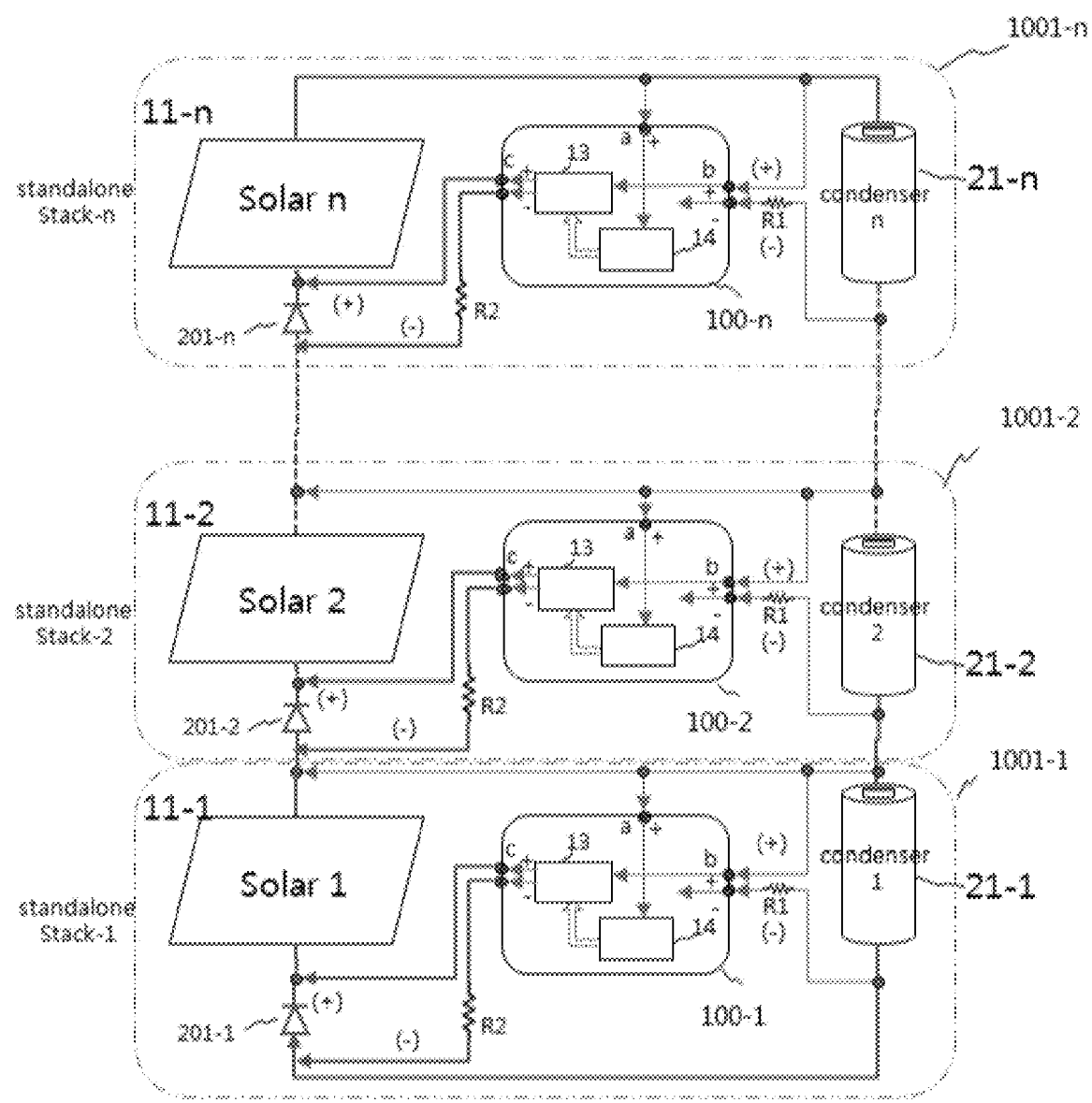
FIG. 17 is a diagram showing a stacked structure of a power pump-added solar module package according to a second embodiment of the present disclosure.

FIG. 17 is a diagram showing a stacked structure of a power pump-added solar module package according to a second embodiment of the present disclosure.

In a configuration in which each solar module and each power pump are combined into a package, the input terminals of power pumps may be connected in parallel to ESS terminals stacked in multiple layers to receive power.

That is, the multi-layer integrated solar power generation facility of the present disclosure includes a solar module 1 configured to supply main power to a load stage;

a power pump unit 13 configured to supply a lifting power to one electrode of the solar module to lift an output of the solar module to a comprehensive potential;

a voltage sensing control unit 14 configured to sense a level of the comprehensive potential; and Power pump input/output interworking units b and c configured to an operation power to an input terminal of the power pump unit 13 and connect an output terminal of the power pump unit 13 to the one electrode of the solar module to supply a lifting power thereto, the operation power being supplied in parallel from batteries respectively provided for unit solar power pump groups and the output terminal of the power pump unit 13 being connected in series to a main power line of the solar module so as to be stacked in multiple stages.

Here, the voltage sensing control unit 14 is connected to a control input terminal of the power pump unit 13 so as to sense a comprehensive potential level of the solar module lifted by the power pump unit 13 and allow the comprehensive potential to be maintained in a set range.

The solar module, the power pump unit 13, the voltage sensing control unit 14, and the power pump input/output inter-working unit are packaged in group units to form the solar power pump groups 100-1, 100-2, and 100-*n*.

In addition, the solar power pump groups are coupled in multiple stages, so that the solar power pump groups, which are the main power line of the solar module, are connected to be stacked in series, and the power pump units 13 in the plurality of unit solar power pump groups coupled in multiple stages operate independently to respectively lift the solar modules to the comprehensive potential level to form inter-working configuration (1001-1, 1001-2, 1001) constituting a power generation facility in which a high voltage is augmented through the combined action of the solar power pump groups.

According to the configuration of FIG. 17, a lifter, that is, each power pump may distribute and maintain a stable input voltage within a terminal voltage range determined by each condenser, and the output of each lifter is distributed and output by a necessary voltage range for each stack unit, thereby reducing load burden of each power pump.

In particular, the parallel power supply path connected from each ESS to the power pump (lifter) is supplied with a small current capacity, and in an inter-working configuration in which the solar modules are connected in series with the 201-1, 201-2, and 201-*n* systems, a main power path is formed with a high current capacity, so that even though the wiring is increased according to the parallel configuration, it is possible to configure a small capacity wiring path with substantially no voltage drop at each power pump input terminal.

In addition, even when shade occurs in each solar module, each power pump independently performs compensation operation.

In addition, each ESS connected in parallel in each package unit is capable of maintaining a set charge voltage, and there is no need to perform an equal charge operation. The equal charge is to make the voltage equalize by overcharging an sufficiently-charged ESS to force current to overflow and forcibly flow to the less charged ESS in order to prevent the uneven charging capacity between ESSs when used for a long time in a series-connected configuration, and in this process, the normal ESS has a side effect of decreasing the lifespan.

In the present disclosure, the lifter (power pump) operates individually according to a state checked for each ESS by an independent parallel structure for each package, so that the ESS may be managed while individually operating each ESS by bulk, option, or floating. Therefore, equal charge itself may be eliminated. As a result, even in the state of being stacked in multiple layers, each individual power pump function is exhibited as it is.

The structure of diodes 201-1, 201-2, and 201-*n* connected in series may be replaced with flywheel diodes in the power pump and may be omitted if necessary.

Figure 18:
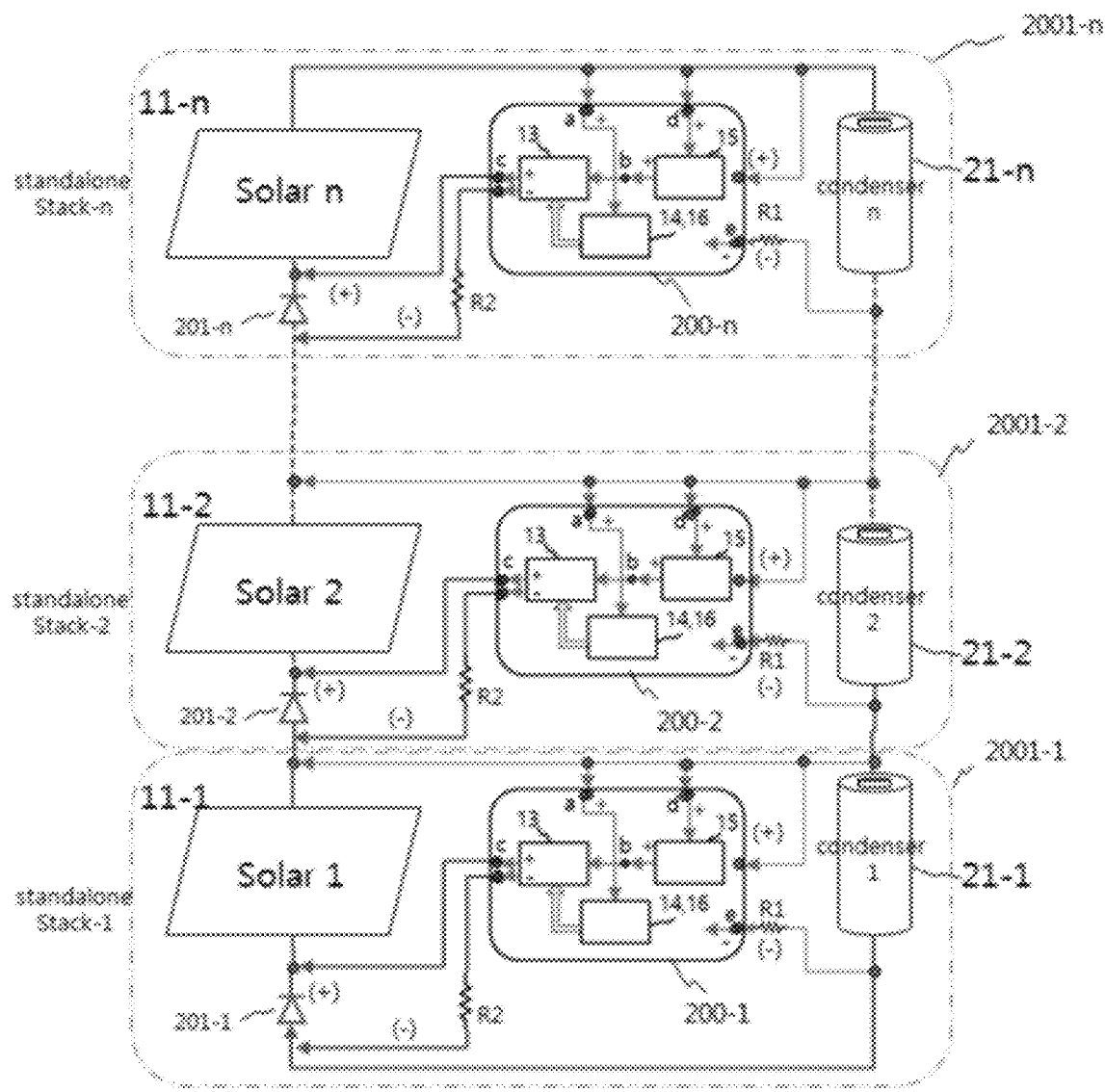
FIG. 18 is a diagram showing a power generation facility employing the power pump block of FIGS. 5A and 5B in which a delay sequence is applied upon the start-up of the power pump as a second voltage sensing control unit according to a second embodiment of the present disclosure.
Figure 19:
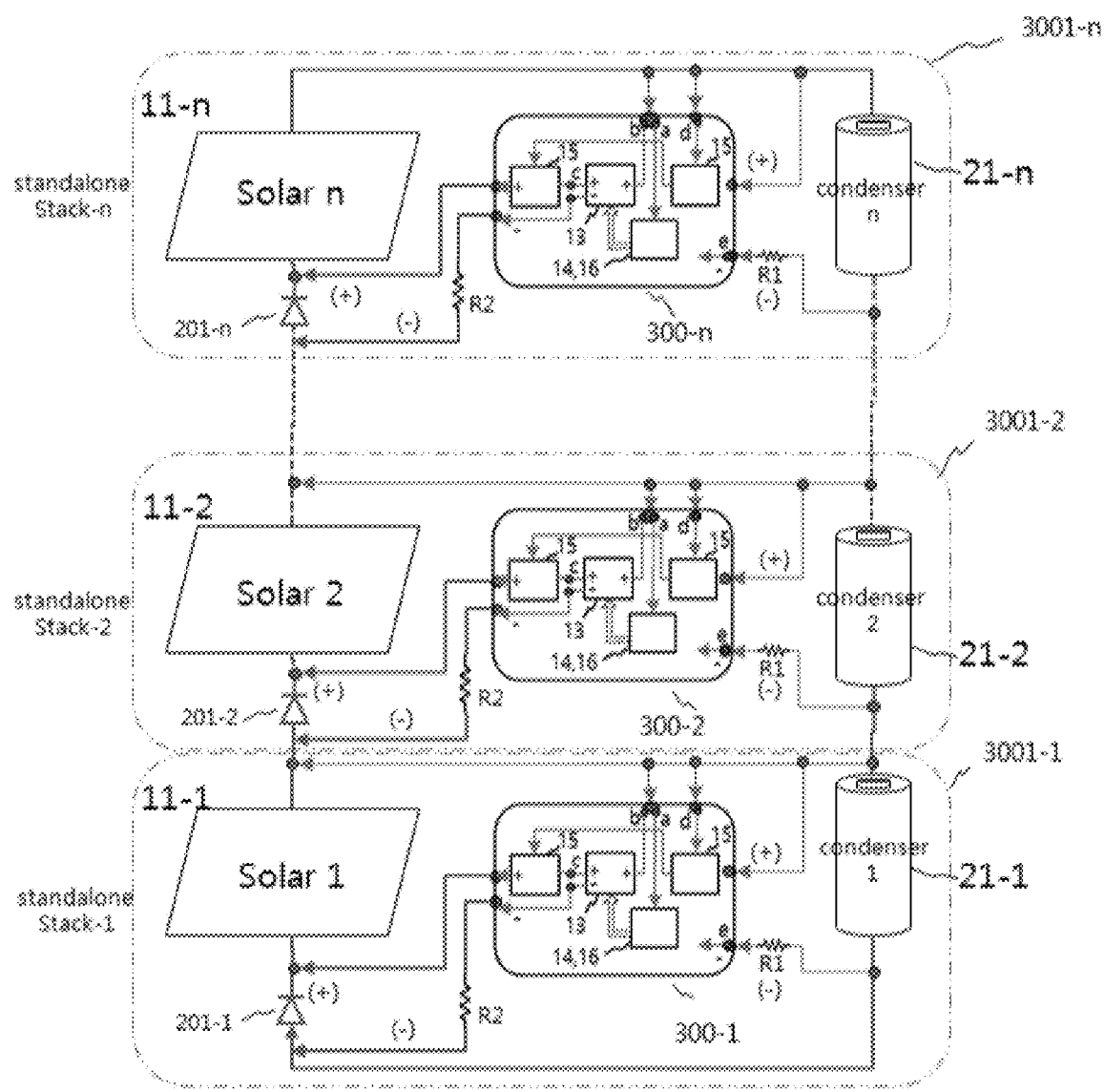
FIG. 19 is a diagram illustrating a power generation device to which the power pump block of FIGS. 7A and 7B is applied to which a delay sequence is applied at an output stage connection of a power pump according to a second embodiment of the present disclosure.

FIG. 18 is a diagram showing a power generation facility employing the power pump block 200 of FIGS. 5A and 5B to which a delay sequence is applied upon the start-up of the power pump as a second voltage sensing control unit according to a second embodiment of the present disclosure and FIG. 19 is a diagram showing a power generation facility employing the power pump block of FIGS. 7A and 7B to which a delay sequence is applied at an output terminal connection of a power pump according to a second embodiment of the present disclosure.

The description for operation associated with blocks 200-1, 200-2, 200-*n*, 300-1, 300-2, and 300-*n* have been given with reference to FIGS. 8 and 9 and will be omitted.

In any case of the power pump block 100 including a simple voltage sensing control unit, the power pump block 200 reinforced with a first voltage sensing control unit and a second voltage sensing control unit, or the power pump block 300 further reinforced with a differential current sensing control unit, the power supply path inputted to the power pumps are distributed in parallel, and the outputs of the power pumps output from the distributed path are integrated and combined in series to form a high voltage and high power main power line.

Figure 20:
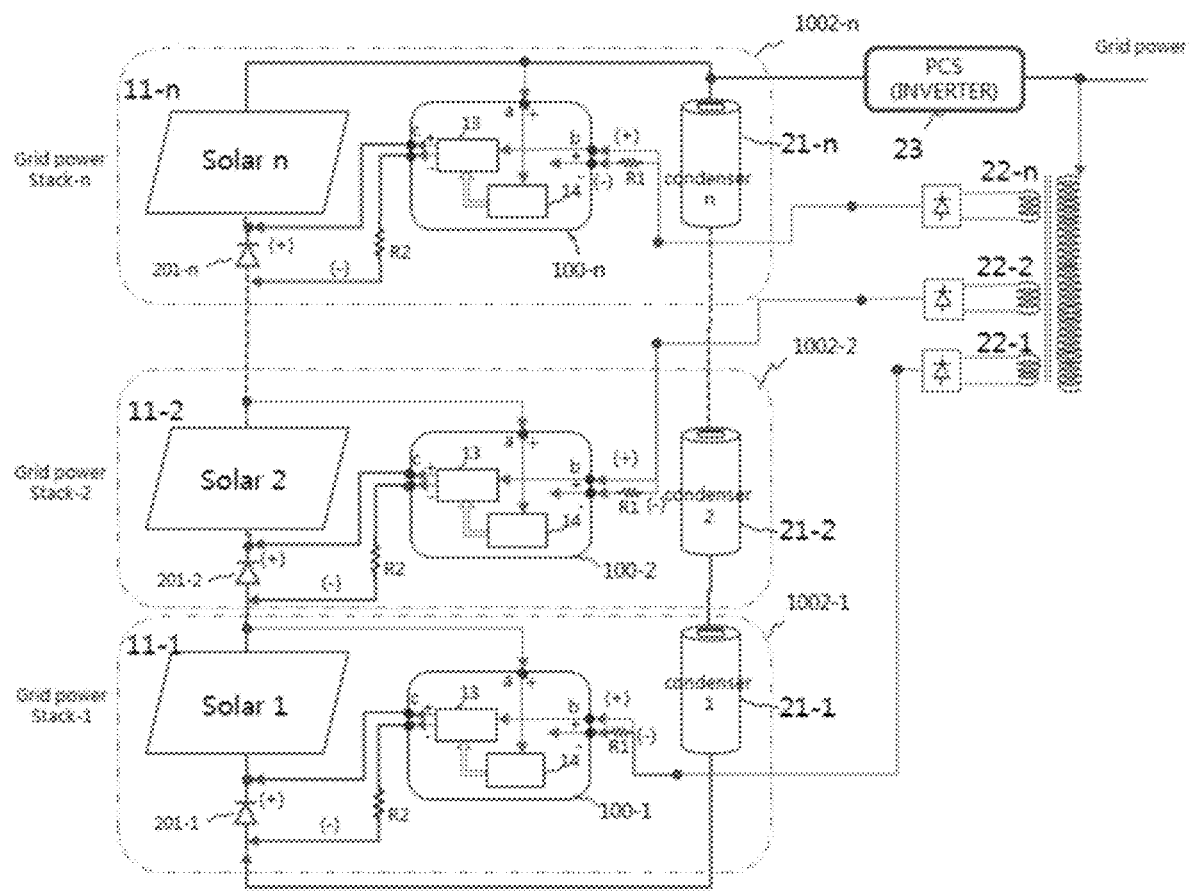
FIG. 20 is a diagram showing a stacked structure of a power pump-added solar module package according to a third embodiment of the present disclosure.

FIG. 20 is a diagram showing a stacked structure of a power pump-added solar module package according to a third embodiment of the present disclosure.

Referring to FIG. 20, in a configuration in which each solar module and each power pump are combined into a package, supply power from a rectifier that is insulated in direct current manner may be connected in parallel to an input terminal of each power pump.

That is, the multi-layer integrated solar power generation facility of the present embodiment includes a solar module 1 configured to supply main power to a load stage;

a power pump unit 13 configured to supply a lifting power to one electrode of the solar module to lift an output of the solar module to a comprehensive potential;

a voltage sensing control unit 14 configured to sense a level of the comprehensive potential; and Power pump input/output interworking units b and c configured to an operation power to an input terminal of the power pump unit 13 and connect an output terminal of the power pump unit 13 to the one electrode of the solar module to supply a lifting power thereto, the operation power being supplied in parallel from an output of a rectifier insulated in direct-current manner for unit solar power pump groups and the output terminal of the power pump unit 13 being connected in series to a main power line of the solar module so as to be stacked in multi stages.

Here, as a configuration in which the voltage sensing control unit 14 is connected to the control input terminal of the power pump unit 13 so as to detect the comprehensive potential level of the solar module lifted by the power pump unit 13 and maintain the comprehensive potential in a set range, the solar power pump groups 100-1, 100-2, and 100-*n* are formed in which the solar module, the power pump unit 13, the voltage sensing control unit 14, and the power pump input/output inter-working unit are packaged in group units.

In addition, a plurality of solar power pump groups are coupled in multiple stages, so that the main power line of the solar module is connected to be stacked in series, and the power pump units in the plurality of unit solar power pump groups coupled in multiple stages operate independently to respectively lift the solar modules to the comprehensive potential level to form inter-working configuration (1001-1, 1001-2, 1001) constituting a power generation facility in which a high voltage is augmented through the combined action of the solar power pump groups.

By the configuration of FIG. 20, the lifter, that is, each power pump, may maintain a stable input voltage within a voltage range independently determined by each rectifier via a transformer and a rectifier in an insulated state supplied from an AC power source. In addition, the output of each lifter is distributed by the required voltage range in each stack unit, so that the load and input of each power pump may be equally distributed in FIG. 20.

As in the case of FIG. 17, the parallel power supply paths supplied to the respective power pumps (lifters) are small current capacities, and the main power lines connected in series to 201-1, 201-2, and 201-*n* in the solar are mains as large current capacities. Since the power path is configured, each of the power pump input ends can be configured with a small capacity wiring path that does not substantially affect the voltage drop.

In addition, even though shade occurs in each solar module, each power pump performs compensation operation independently.

Figure 21:
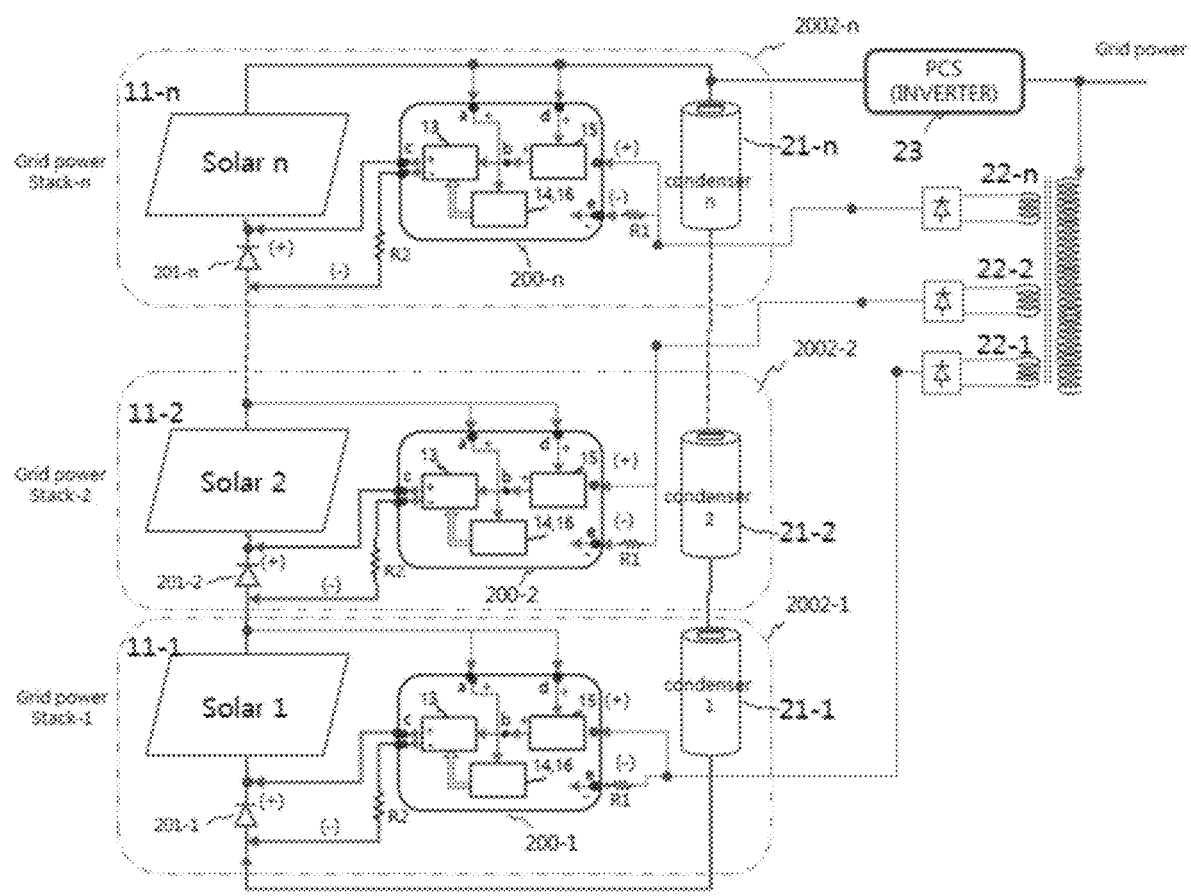
FIG. 21 is a diagram illustrating a power generation apparatus to which the power pump block of FIGS. 5A and 5 B is applied to which a delay sequence is applied in starting a power pump according to a third embodiment of the present disclosure.
Figure 22:
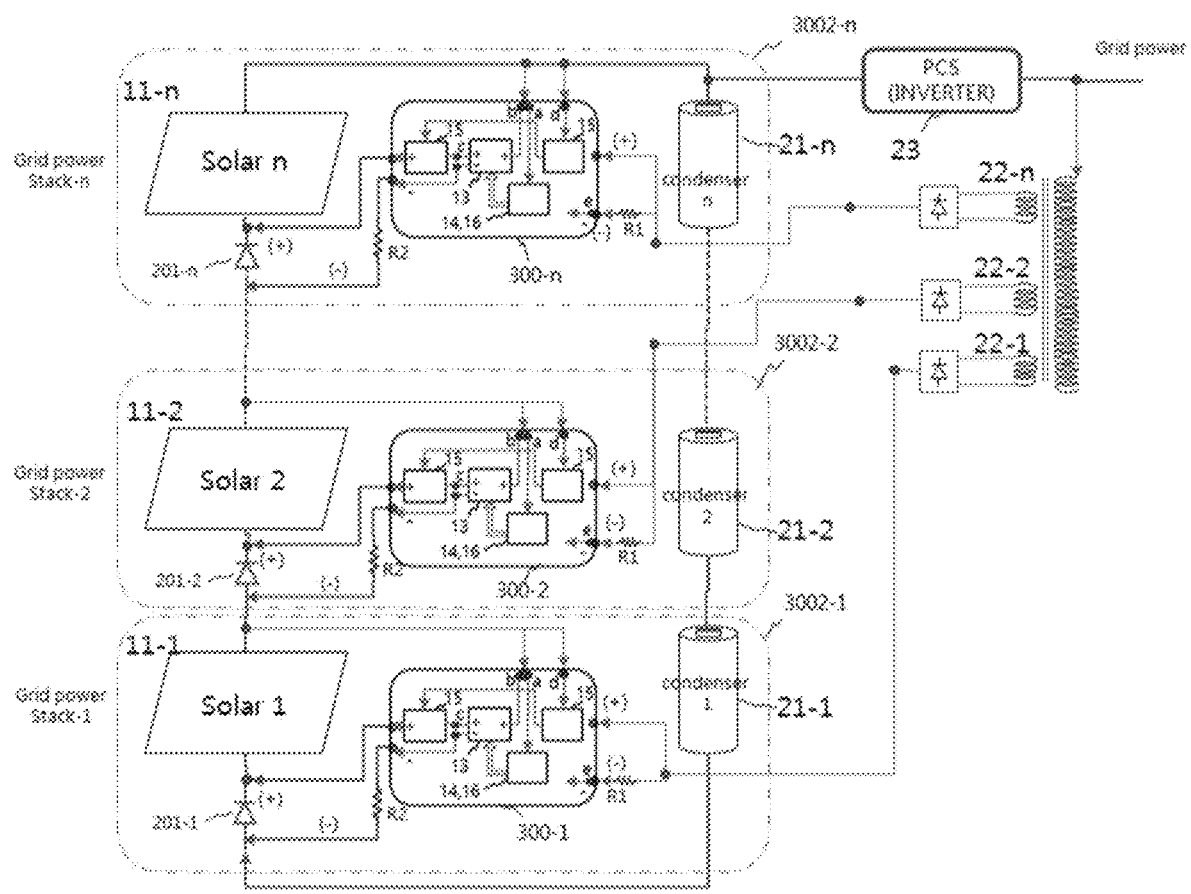
FIG. 22 is a diagram illustrating a power generation facility employing the power pump block of FIGS. 7A and 7B is applied to which a delay sequence is applied in an output stage connection of a power pump according to a third embodiment of the present disclosure.

FIG. 21 is a diagram showing a power generation facility employing the power pump block of FIGS. 5A and 5B to which a delay sequence is applied in starting a power pump according to a third embodiment of the present disclosure, and FIG. 22 a diagram showing a power generation facility employing the power pump block of FIGS. 7A and 7B to which a delay sequence is applied at an output terminal connection a power pump according to a third embodiment of the present disclosure.

The description for operation associated with blocks 200-1, 200-2, 200-*n*, 300-1, 300-2, and 300-*n* have been given above and will be omitted.

In any case of the power pump block 100 including a simple voltage sensing control unit, the power pump block 200 reinforced with a first voltage sensing control unit and a second voltage sensing control unit, or the power pump block 300 further reinforced with a differential current sensing control unit, the power supply path inputted to the power pumps are distributed in parallel, and the outputs of the power pumps output from the distributed path are integrated in series to form a high voltage and high power main power line.

Figure 23:
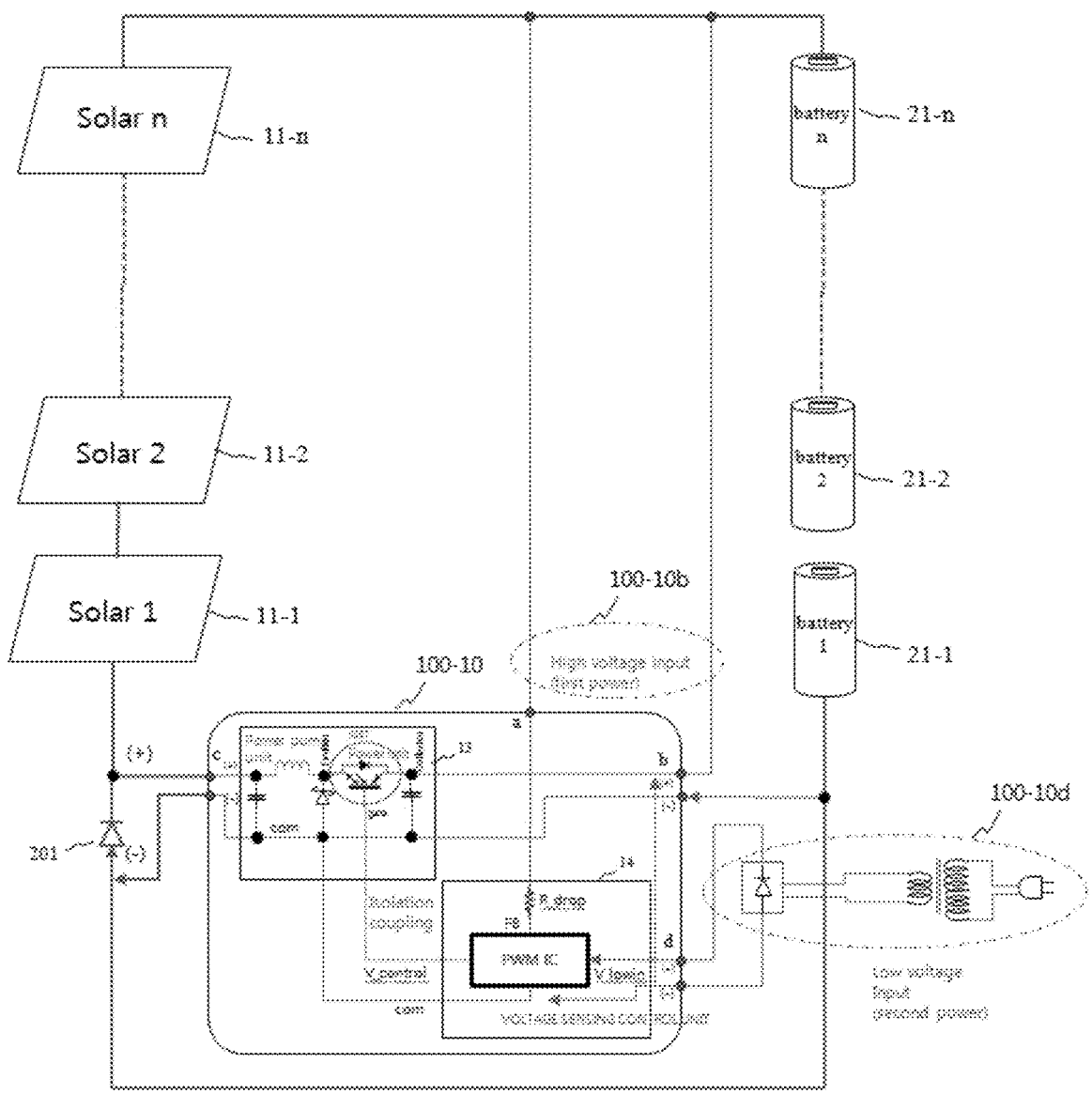
FIG. 23 is a diagram illustrating a concept of combining a plurality of solar cells in series with one power pump unit by mixing the concepts of the first and third embodiments.

FIG. 23 is a diagram showing the concept of combining a plurality of solar cells in series into one power pump unit by mixing the concepts of the first and third embodiments.

In a configuration in which multiple solar modules are connected in series, one power pump may is comprehensively connected thereto, thereby causing a problem of high voltage breaking, especially in the power sensing control unit. Although power devices have been developed to withstand high voltage of hundreds of volts or more, it is difficult to design circuits freely when a control unit for controlling this, that is, a control unit formed of integrated circuits has only voltage resistance characteristics of several tens of volts. Even if it is possible, the price is very expensive or it is accompanied by a decrease in efficiency due to voltage drop.

FIG. 23 solves the problem by mixing the concepts of the first embodiment and the concept of the third embodiment. That is, the high voltage generated in the stack of the plurality of solar modules is supplied to a power unit of the power pump unit through the input terminal b so as to connect a plurality of solar in series with one power pump unit, and separate low voltage in an insulated state is supplied to the voltage sensing control unit for controlling the power pump unit through the input terminal d. The power pump unit of the high voltage system and the voltage sensing control unit of the low voltage system may be operatively coupled and matched by isolation.

In FIG. 23, a high voltage, for example, 192V is directly supplied to a power unit which is the power pump unit through the input terminal b of a block 100-10. On the other hand, since the voltage sensing control unit constituting the PWM has low voltage resistance, the integrated circuit (IC) thereof is supplied with a separate low voltage distinct from the high positive voltage (+), for example, a power of 24V rectified and supplied from a commercial power supply.

On the other hand, the high voltage of 192V is also supplied to the input terminal a, but the voltage is converted to a level capable of detecting the comprehensive potential within a range of 24V by a breather R-drop and supplied to the integrated circuit.

As a result, the high voltage and the low voltage are supplied separately according to the circuit characteristics as multiple power, and are matched and coupled as a control signal internally through isolation, and a result inter-working configuration leads to the same results as described above. As a result, a plurality of solar modules may be stacked in series.

An input terminal (gate) of the power unit inter-working with an integrated circuit (IC) output constituting the PWM may be driven by an element such as a gate-isolated IGBT or an optocoupler of a gate isolation type, and GaN TR, FET, or the like may also be applied as a power element as long as the positive power level is separated.

In this multi-power inter-working configuration, since the high voltage is used as an input power of a power unit, the amount of power loss in operating the power pump is small in terms of current, and the voltage sensing control unit consumes less power, thus miniaturizing the capacity of a rectifier provided from a commercial power supply, and extremely simplifying installation.

On the other hand, when the negative (−) input supplied to the input terminal d is connected to a com line, the maximum output voltage of the power pump unit is limited to a input terminal (V_lowin) range of the low voltage supplied to the integrated circuit. However, when (−) supplied to input terminal d is connected to input terminal b, the maximum output voltage of the power pump unit may be expanded regardless of the low voltage input terminal (V_lowin) voltage supplied to the integrated circuit. While a variable range may be freely set in a solar package using the above-described characteristics, for example, an ultra-high voltage power generation facility in which voltage units of 192V is capable of being stacked in multiple stages.

Figure 24:
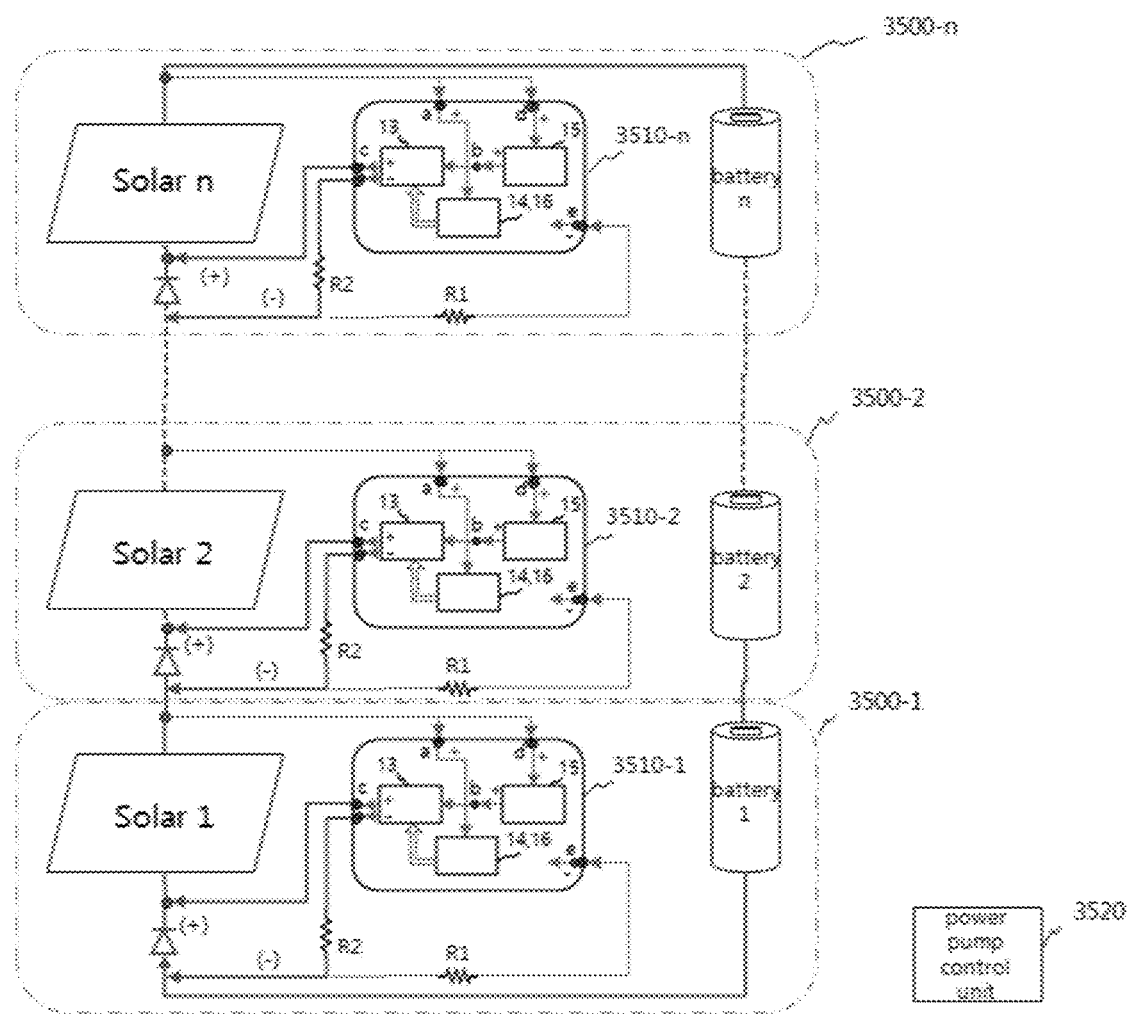
FIG. 24 is a diagram showing a power generation facility according to a fourth embodiment of the present disclosure.
Figure 25:
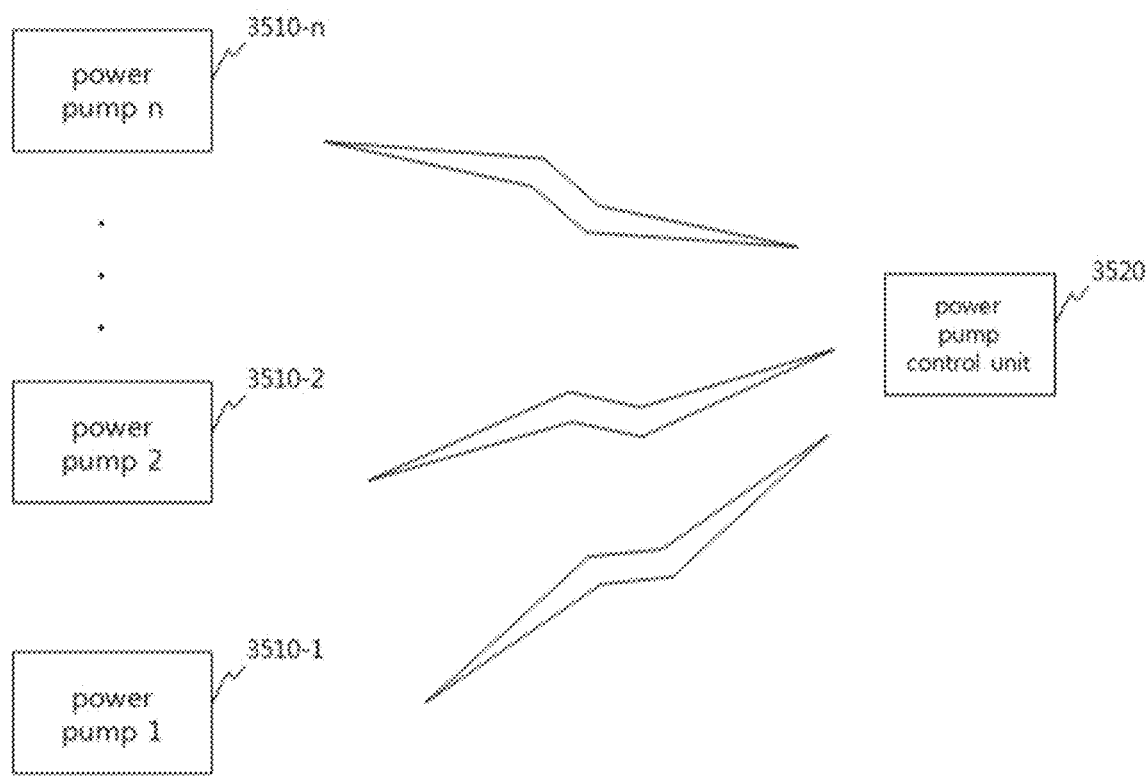
FIG. 25 is a diagram showing only a power pump and a power pump control unit of the power generation facility of FIG. 13 according to an embodiment of the present disclosure.
Figure 26:
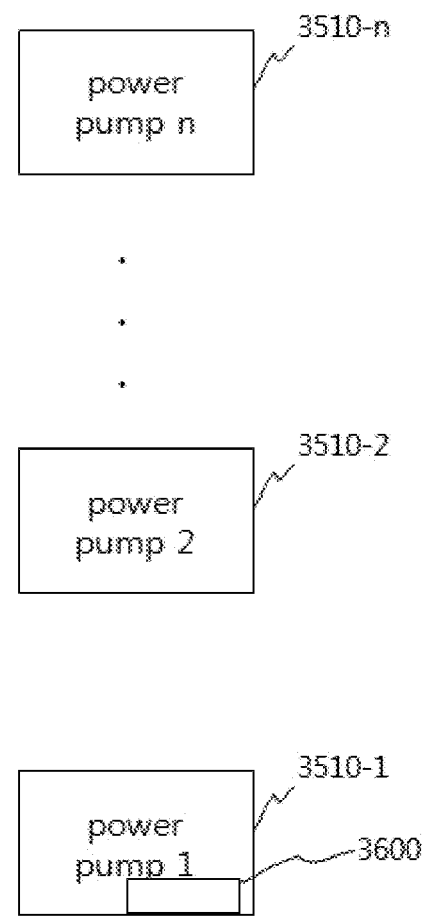
FIG. 26 is a diagram showing only a power pump and a power pump control unit of a power generation facility according to another embodiment of the present disclosure.

FIG. 24 is a diagram showing a power generation facility according to a fourth embodiment of the present disclosure, FIG. 25 is a diagram showing only a power pump and a power pump control unit in the power generation facility of FIG. 24. FIG. 26 is a diagram showing only a power pump and a power pump control unit in the power generation facility according to another embodiment of the present disclosure.

Referring to FIGS. 24 and 25, the power generation facility of the present embodiment may include a plurality of solar module packages 3500-1, 3500-2, 3500-n and a power pump control unit 3520 to which a power pump is added.

Since operations of the solar module packages 3500-1, 3500-2, and 3500-n except for the power pump control unit 3520 are the same as those of the above embodiments, a description thereof will be omitted.

As shown in FIG. 25, the power pump control unit 3520 may be wirelessly connected to power pumps 3510-1, 3510-2, and 3510-n of the solar module packages 3500-1, 3500-2, and 3500-n and controls the operations of the power pumps 3510-1, 3510-2 and 3510-n. Of course, the power pump control unit 3520 may also be connected thereto by wire.

For example, the power pump control unit 3520 may control the power pumps 3510-1, 3510-2, and 3510-n such that the solar modules solar 1, solar 2, and solar n output the same voltage.

As another example, when some of the solar modules solar 1, solar 2, and solar n do not operate due to a failure, the power pump control unit 3520 may detect whether or not the total power (summed power) of the solar module packages 3500-1 and 3500-2, and 3500-n has decreased by detecting a battery charge voltage, and when the total power has decreased, determine that a specific solar module has failed and control the power pumps 3510-1, 3510-2, and 3510-n so as to increase the output voltage of each of the power pumps 3510-1, 3510-2, 3510-n. As a result, even though a specific solar module that has failed is included, the other solar modules output more power, so that the total power outputted from the series-connected solar module packages 3500-1, 3500-2, and 3500-n may be maintained. This is because current flows through a main line passing through the solar modules solar 1, solar 2, and solar n regardless of the failure of the solar module. Using this control method, it is possible to maintain the total power stably without detecting a faulty solar module.

Of course, it is possible to detect a faulty solar module through the above control method. For example, when a specific solar module is controlled to output more power than other solar modules to increase the total power, it is determined that the specific solar module operates normally, and when the total power does not increase, it is determined that the specific solar module has failed.

According to another embodiment, the power pump control unit 3520 may detect a faulty solar module package. Specifically, the power pump control unit 3520 is periodically provided with power information from the power pumps 3510-1, 3510-2, and 3510-n, and when the power information is not provided or power contained in the power information is out of a predetermined range, it is possible to determine that the solar module package has failed.

Meanwhile, although the power pump control unit 3520 is described as being separate from the solar module packages 3500-1, 3500-2, and 3500-n, as shown in FIG. 26, the power pump control unit 3600 may be present in the power pump of a specific solar module. That is, the power pump including the power pump control unit 3600 may operate as a master. The operation of the power pump control unit 3600 is the same as the operation of the power pump control unit 3520 described above.

Figure 27:
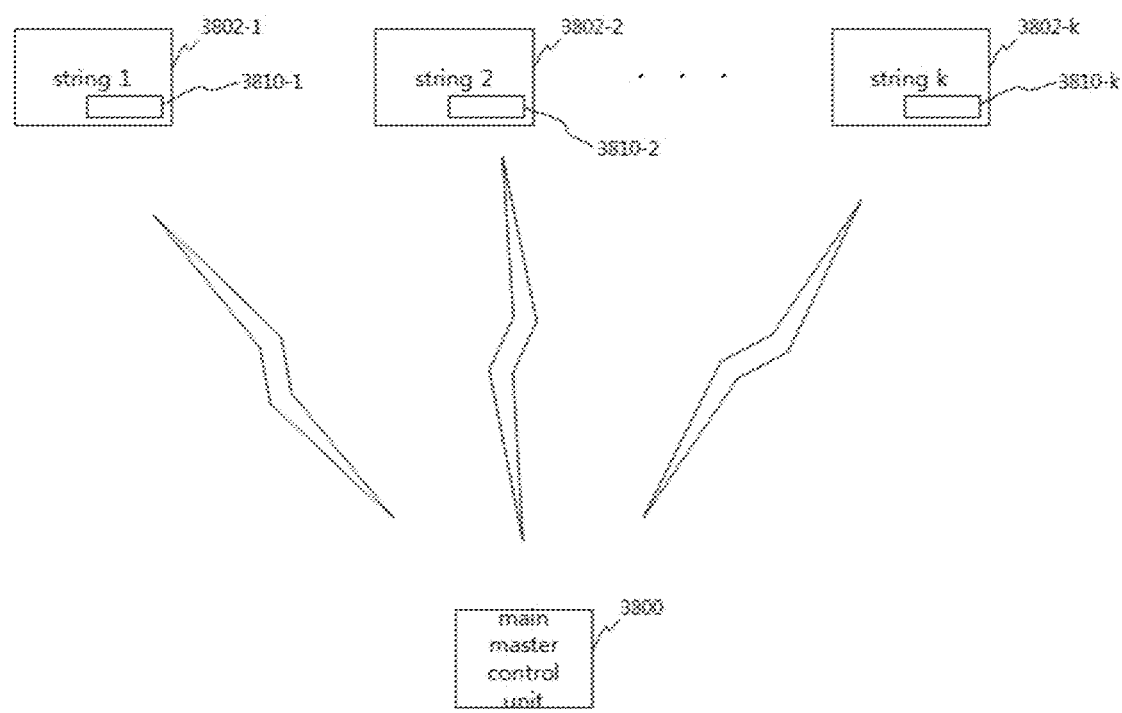
FIG. 27 is a diagram showing a power generation facility according to a fourth embodiment of the present disclosure.

FIG. 27 is a diagram showing a power generation facility according to a fourth embodiment of the present disclosure.

Referring to FIG. 27, the power generation facility of the present embodiment may include a main master control unit 3800 and a plurality of strings 3802-1, 3802-2, and 3802-k. Here, each of the strings 3802-1, 3802-2, and 3802-k may be any one of the multi-layer integrated solar power generation facilities described in the above embodiments. Here, K is an integer of 2 or more.

That is, the multi-layer integrated solar power generation facility (sub power generation facility) forms one string, and a plurality of strings may constitute the power generation facility of this embodiment.

The main master control unit 3800 may be connected to the strings 3802-1, 3802-2, and 3802-k in a wired or wireless manner, and monitor the amount of power generation of the strings 3802-1, 3802-2, and 3802-k or detect failures.

In this case, the strings 3802-1, 3802-2, and 3802-k may include a power pump control unit 3810-1, 3810-2, and 3810-k, respectively. In this case, the main master control unit 3800 may be connected to the power pump control unit 3810-1, 3810-2, and 3810-k of the strings 3802-1, 3802-2, and 3802-k.

According to another embodiment, when a specific string fails, the main master control unit 3800 may allow other strings to output more power such that the power generation facility outputs stable power.

According to another embodiment, the main master control unit 3800 may be separate from the strings 3802-1, 3802-2, and 3802-k, but the strings 3802-1, 3802-2, and 3802-k may be included in one of the strings 3802-1, 3802-2, and 3802-k.

On the other hand, the components of the above-described embodiment can be easily understood in terms of process. That is, each component may be identified as each process. In addition, the process of the above-described embodiment can be easily understood in terms of the components of the apparatus.

The technical contents described above may be embodied in the form of program commands executable through various computer means, which may be recorded on a computer-readable recording medium. The computer-readable recording medium may include program commands, data files, and data structures either alone or in combination. The program commands recorded on the computer-readable recording medium may be those that are especially designed and configured for the embodiments, or may be those that are known and available to those skilled in the computer software arts. Examples of the computer-readable recording medium include magnetic recording media such as hard disks, floppy disks and magnetic tapes, optical recording media such as CD-ROMs and DVDs, magneto-optical recording media such as floptical disks, and hardware devices such as ROMs, RAMs and flash memories that are especially configured to store and execute program commands. Examples of the program commands include machine language codes that may be generated by a compiler, and high-level language codes that may be executed by a computer by using an interpreter. The hardware device may be configured to operate as one or more software modules to perform the operations of the embodiments, and vice versa.

INDUSTRIAL APPLICABILITY

The scope of the present disclosure is represented by the following claims, and it should be construed that all changes or modifications derived from the meaning and scope of the claims and their equivalents are included in the scope of the present disclosure.

The invention claimed is:

1. A solar generation facility comprising:
a plurality of solar module packages connected in series to one another and stacked in multiple layers; and
at least one condenser corresponding to the solar module packages,
wherein at least one of the solar module packages includes
a solar module configured to supply power to a load stage; and
a power pump configured to provide lifting power to the solar module, and
wherein the solar module outputs the power by reflecting lifting power provided from the power pump.

2. The solar generation facility of claim 1, wherein a part of the power output from the solar module is input to the power pump and the condensers correspond to the solar module packages in one-to-one relationship.

3. The solar generation facility of claim 1, wherein the power pump includes
a power pump unit configured to supply the lifting power to the solar module to increase power output from the solar module to a comprehensive potential;
a first voltage sensing control unit configured to sense a level of the comprehensive potential; and
a second voltage sensing control unit configured to allow the power pump unit to operate when electromotive force not less than a set voltage to the solar module is generated,
wherein the first voltage sensing control unit control an operation range of the power pump unit, the second voltage sensing control unit controls start-up of the power pump unit, and an output current of the power pump unit is followed by an output current of the solar module and varies according to an intensity of sunlight.

4. The solar generation facility of claim 1, wherein the second voltage sensing control unit or the power pump unit includes a buffering capacitor that activates a power supply input terminal or output terminal path as a delay sequence soft connection upon initial start-up.

5. The solar generation facility of claim 3, wherein the first voltage sensing control unit includes a differential current sensing control unit configured to compares a current output from the power pump unit and a current supplied to the power pump unit and control an operation of the power pump unit in response to a result of the comparison.

6. The solar generation facility of claim 5, wherein the differential current sensing control unit includes a configuration configured to, using a first current sensor connected to an input terminal of the power pump unit and a second current sensor connected to an output terminal of the power pump unit, compare and control currents detected by the sensors.

7. The solar generation facility of claim 5, wherein the differential current sensing control unit includes a configuration configured to, using a hall sensor connected to an input terminal of the power pump unit and a second hall sensor connected to an output terminal of the power pump unit, allow currents detected by the hall sensors to be offset.

8. The solar generation facility of claim 5, wherein the solar generation facility includes a power pump unit alone, wherein a first voltage output from the solar module is supplied to a power unit of the power pump unit and a second voltage lower than the first voltage is applied to a second voltage sensing control unit for controlling the power pump unit and the power pump unit and the second voltage sensing control unit operatively match each other through isolation.

9. The solar generation facility of claim 1, further comprising:
a power pump control unit,
wherein the power pump control unit is connected to the power pumps wirelessly and, when one of the solar module packages has failed, control corresponding power pumps such that other solar module packages output higher power,
wherein a current always flows through a line via the solar modules regardless of whether the solar module package has failed.

10. The solar generation facility of claim 9, wherein the power pump control unit is included in one of the power pumps.

11. The solar generation facility of claim 10, wherein the power pump control unit periodically receives power information from the power pumps, and when the power information is not provided or power contained in the power information is out of a predetermined range, determines that a corresponding power pump has failed.

12. A solar generation facility comprising:
a solar module configured to supply power to a load stage;
a power pump configured to provide lifting power to the solar module; and
a condenser configured to store power output from the solar module,
wherein a part of the power output from the solar module is input to the power pump, the power pump outputs lifting power according to the input power, and the solar module increases the power to a comprehensive potential by reflecting the lifting power provided by the power pump and outputs the power.

13. The solar generation facility of claim 12, wherein the power pump includes
a power pump unit configured to supply the lifting power to the solar module to increase power output from the solar module to the comprehensive potential;
a first voltage sensing control unit configured to sense a level of the comprehensive potential; and
a second voltage sensing control unit configured to allow the power pump unit to operate when electromotive force not less than a set voltage to the solar module is generated,
wherein the first voltage sensing control unit control an operation range of the power pump unit, the second voltage sensing control unit controls start-up of the power pump unit, and an output current of the power pump unit is followed by an output current of the solar module and varies according to an intensity of sunlight.

14. The solar generation facility of claim 13, the second voltage sensing control unit or the power pump unit includes a buffering capacitor that activates a power supply input terminal or output terminal path as a delay sequence soft connection upon initial start-up.

15. The solar generation facility of claim 13, wherein the first voltage sensing control unit includes a differential current sensing control unit configured to compares a current output from the power pump unit and a current supplied to the power pump unit and control an operation of the power pump unit in response to a result of the comparison.

16. A solar generation facility comprising:
a plurality of strings; and
a main master control unit connected to the strings through communication to control operations of the strings,
wherein at least one of the strings includes,
a solar module configured to supply power to a load stage;
a power pump configured to provide lifting power to the solar module; and
a condenser configured to store power output from the solar module,
wherein the main master control unit monitors power output by the strings and detects failure of the strings.

17. The solar generation facility of claim 16, wherein, when it is determined that one of the strings has failed, the main master control unit allows other strings to output higher power.

18. The solar generation facility of claim 16, wherein each of the strings includes a plurality of solar module packages connected in series to one another and stacked in multiple layers, and
wherein each of the solar module packages has the solar module and the power pump.

19. The solar generation facility of claim 16, wherein a part of the power output from the solar module is input to the power pump, the power pump outputs a lifting power according to the input power, and the solar module increases the power to a comprehensive potential by reflecting the lifting power provided by the power pump and outputs the power.

20. The solar generation facility of claim 16, wherein the main master control unit is included in one of the strings.

* * * * *